US012794801B2

(12) United States Patent
Chen

(10) Patent No.: US 12,794,801 B2
(45) Date of Patent: Nov. 10, 2026

(54) PCE CONTROLLED NETWORK RELIABILITY

(71) Applicant: HUAWEI TECHNOLOGIES CO., LTD., Shenzhen (CN)

(72) Inventor: Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 928 days.

(21) Appl. No.: 17/896,514

(22) Filed: Aug. 26, 2022

(65) Prior Publication Data

US 2022/0417136 A1 Dec. 29, 2022

Related U.S. Application Data

(63) Continuation of application No. PCT/US2020/066595, filed on Dec. 22, 2020.

(60) Provisional application No. 62/982,431, filed on Feb. 27, 2020.

(51) Int. Cl.
*H04L 45/28* (2022.01)

(52) U.S. Cl.
CPC .................................... *H04L 45/28* (2013.01)

(58) Field of Classification Search
None
See application file for complete search history.

(56) References Cited

U.S. PATENT DOCUMENTS

| | | | | |
|---|---|---|---|---|
| 6,628,620 | B1 * | 9/2003 | Cain | H04L 45/28 455/449 |
| 6,675,199 | B1 * | 1/2004 | Mohammed | H04L 67/1001 709/227 |
| 9,807,051 | B1 * | 10/2017 | Mohanty | H04L 41/0654 |
| 10,673,957 | B2 * | 6/2020 | Tse | H04L 47/125 |
| 10,778,326 | B1 * | 9/2020 | Mukhopadhyay | H04L 1/0061 |

(Continued)

FOREIGN PATENT DOCUMENTS

| | | |
|---|---|---|
| CN | 102195865 A | 9/2011 |
| CN | 106161333 A | 11/2016 |

OTHER PUBLICATIONS

Bradner, "Key Words for Use in RFCs to Indicate Requirement Levels," RFC 2119, Mar. 1997, 3 pages.

(Continued)

*Primary Examiner* — Khaled M Kassim
*Assistant Examiner* — Shima Wasel
(74) *Attorney, Agent, or Firm* — Conley Rose, P.C.

(57) ABSTRACT

A method implemented by a secondary controller in a controller cluster including a primary controller and the secondary controller. The method includes detecting a failure of a communication link between the primary controller and the secondary controller; transmitting a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the failure; receiving a second message from the network element, wherein the second message includes a second controllers TLV structure that indicates a status of the primary controller; and determining to maintain its position as the secondary controller for the controller cluster when the status of the primary controller is active.

21 Claims, 28 Drawing Sheets

(56) References Cited

U.S. PATENT DOCUMENTS

| | | | | |
|---|---|---|---|---|
| 10,983,880 | B2 * | 4/2021 | Gupta | H04L 69/40 |
| 2009/0182894 | A1 * | 7/2009 | Vasseur | H04L 45/28 709/239 |
| 2011/0078490 | A1 * | 3/2011 | He | H04L 67/1001 714/E11.073 |
| 2012/0230222 | A1 * | 9/2012 | Shaffer | H04L 45/48 370/254 |
| 2014/0044431 | A1 * | 2/2014 | Hussain | H04J 14/0263 398/79 |
| 2014/0092723 | A1 * | 4/2014 | Murphy | H04W 24/04 370/328 |
| 2015/0009796 | A1 | 1/2015 | Koponen | |
| 2015/0036540 | A1 * | 2/2015 | Kasslin | H04W 48/16 370/254 |
| 2016/0113006 | A1 * | 4/2016 | Murphy | H04W 76/12 370/338 |
| 2016/0165463 | A1 * | 6/2016 | Zhang | H04L 43/10 370/218 |
| 2017/0257228 | A1 | 9/2017 | Chen | |
| 2017/0324650 | A1 * | 11/2017 | Przygienda | H04L 45/60 |
| 2018/0013787 | A1 | 1/2018 | Jiang | |
| 2018/0262959 | A1 * | 9/2018 | Yang | H04W 28/088 |
| 2019/0020656 | A1 * | 1/2019 | Arjun | H04L 67/1001 |
| 2019/0036765 | A1 * | 1/2019 | Ghosal | G06F 11/2097 |
| 2020/0042410 | A1 * | 2/2020 | Gupta | H04L 67/1097 |
| 2022/0095219 | A1 * | 3/2022 | Nakagawa | H04W 88/10 |

OTHER PUBLICATIONS

Crabbe, et al., "Path Computation Element Communication Protocol (PCEP) Extensions for Stateful PCE," RFC 8231, Sep. 2017, 57 pages.

Filsfils, Ed., et al., "Segment Routing Architecture," RFC 8402, Jul. 2018, 32 pages.

Vasseur, Ed., et al., "Path Computation Element (PCE) Communication Protocol (PCEP)," RFC 5440, Mar. 2009, 87 pages.

* cited by examiner

PCE CONTROLLED NETWORK RELIABILITY

CROSS-REFERENCE TO RELATED APPLICATIONS

This patent application is a continuation of International Application No. PCT/US2020/066595 filed on Dec. 22, 2020, by Futurewei Technologies, Inc., and titled "PCE Controlled Network Reliability," which claims the benefit of U.S. Provisional Patent Application No. 62/982,431 filed Feb. 27, 2020 by Futurewei Technologies, Inc., and titled "System and Method for PCE Controlled Network Reliability," which is hereby incorporated by reference.

TECHNICAL FIELD

The present disclosure is generally related to network communication, and is specifically related to a path computational element (PCE) controlled network.

BACKGROUND

In a Path Computation Element (PCE) controlled network, every network element (NE) in the network is controlled by a PCE controller cluster, which normally comprises two or more controllers working together to control the network (i.e., the network elements).

For the controller cluster comprising only two controllers (i.e., primary and secondary controller), there may be two separated primary controllers controlling the network at the same time when the connection between the two controllers is broken. The secondary controller assumes that the primary controller is dead and promotes itself as the new primary controller to control the network.

For the controller cluster comprising more than two controllers (i.e., primary controller, secondary controller, third controller, and so on), the failures in the cluster may split the cluster into a few separated controller groups. These groups do not know each other. Two or more groups may be elected as primary groups controlling the network at the same time.

SUMMARY

The disclosed embodiments provide path computation element protocol (PCEP) extensions transmitted through network elements (NEs). The PCEP extensions ensure separated controllers (or separated controller groups) are able to correctly determine whether a new primary controller (or new primary controller group) should be promoted when a link between the controllers, or a controller itself, has failed. Therefore, the PCEP extensions prevent more than one primary controller (or primary controller group) from managing or attempting to manage a network at the same time, which would lead to network instability, packet loss, and other undesirable results. Thus, controllers implementing the PCEP extensions disclosed herein are able to better manage a telecommunication network relative to current technology.

A first aspect relates to a method implemented by a secondary controller in a controller cluster including a primary controller and the secondary controller, comprising: detecting a failure of a communication link between the primary controller and the secondary controller; transmitting a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the failure; receiving a second message from the network element, wherein the second message includes a second controllers TLV structure that indicates a status of the primary controller; and determining to maintain its position as the secondary controller for the controller cluster when the status of the primary controller is active.

Optionally, in any of the preceding aspects, another implementation of the aspect provides that Optionally, in any of the preceding aspects, another implementation of the aspect provides the indication in the controllers TLV structure that the secondary controller intends to promote itself comprises a C-bit set to a first value and a position field set to a second value.

Optionally, in any of the preceding aspects, another implementation of the aspect provides the first value is zero and the second value is one.

Optionally, in any of the preceding aspects, another implementation of the aspect provides the controllers TLV structure further identifies a number of controllers advertising the controllers TLV structure, an old position of the secondary controller, a priority of the secondary controller, and an identifier (ID) of the secondary controller.

Optionally, in any of the preceding aspects, another implementation of the aspect provides one or more of the first message and the second message are exchanged over an information channel.

Optionally, in any of the preceding aspects, another implementation of the aspect provides one or more of the primary controller and the secondary controller is a path computational element (PCE), and wherein the network element is a path computational client (PCC).

Optionally, in any of the preceding aspects, another implementation of the aspect provides transmitting an open message to the network element to indicate a capability for high availability of controllers (HAC).

Optionally, in any of the preceding aspects, another implementation of the aspect provides the open message includes an open object, wherein the open object includes a controller capability TLV structure, wherein the controller capability TLV structure includes a second C-bit, wherein the second C-bit is set to a first value to indicate the secondary controller is a controller.

A second aspect relates to a method implemented by a secondary controller in a controller cluster including a primary controller and the secondary controller, comprising: detecting a potential failure of the primary controller; transmitting a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the potential failure; failing to receive, within a predetermined period of time, a second message from the network element indicating that the primary controller is still active; and promoting itself to the new primary controller for the controller cluster.

Optionally, in any of the preceding aspects, another implementation of the aspect provides the indication in the controllers TLV structure that the secondary controller is attempting to promote itself comprises a C-bit set to a first value and a position field set to a second value.

Optionally, in any of the preceding aspects, another implementation of the aspect provides the first value is zero and the second value is one.

Optionally, in any of the preceding aspects, another implementation of the aspect provides removing an information channel between the secondary controller and the network element and establishing a control channel between the secondary controller and the network element after the secondary controller has promoted itself to the new primary controller for the controller cluster.

Optionally, in any of the preceding aspects, another implementation of the aspect provides transmitting, to the network element, a third message including an updated controllers TLV structure, the updated controllers TLV structure comprising a C-bit set to a first value and a position field set to the second value to indicate that the secondary controller is the new primary controller, wherein the first value is one.

Optionally, in any of the preceding aspects, another implementation of the aspect provides the first message is transmitted over an information channel, and wherein the third message is transmitted over the information channel or a control channel.

Optionally, in any of the preceding aspects, another implementation of the aspect provides one or more of the primary controller and the secondary controller is a path computational element (PCE), and wherein the network element is a path computational client (PCC).

A third aspect relates to a method implemented by a network element (NE) in communication with a primary controller and a secondary controller in a controller cluster, comprising: receiving a first message from the secondary controller, wherein the first message includes a controllers type length value (TLV) structure with an indication that the secondary controller is attempting to promote itself to a new primary controller for the controller cluster based on detection of a failure of a communication link between the primary controller and the secondary controller; transmitting the first message to the primary controller; receiving a second message from the primary controller, wherein the second message includes a second controllers type length value (TLV) structure with an indication that the primary controller is still active; and transmitting the second message to the secondary controller to prevent the secondary controller from promoting itself to the new primary controller.

Optionally, in any of the preceding aspects, another implementation of the aspect provides the indication in the controllers TLV structure that the secondary controller is attempting to promote itself comprises a C-bit set to a first value and a position field set to a second value, wherein the first value is zero and the second value is one.

Optionally, in any of the preceding aspects, another implementation of the aspect provides the indication in the second controllers TLV structure that the primary controller is still active comprises a second C-bit set to one and a second position field set to one.

A fourth aspect relates to a method implemented by a secondary controller in a controller cluster, comprising: detecting a failure that divides the controller cluster into a first controller group and a second controller group, wherein the second controller group includes the secondary controller; transmitting a first message to a network element (NE) in communication with each controller in the controller cluster, wherein the first message includes a controllers type length value (TLV) structure identifying the secondary controller as an intended primary controller for the second controller group, a total number of controllers in the second controller group, and a prior position of the secondary controller in the controller cluster; receiving a second message from the NE, wherein the second message includes a second controllers TLV structure identifying a primary controller from the first controller group as an intended primary controller for the first controller group, a number of controllers in the first controller group, and a prior position of the primary controller in the controller cluster; comparing the number of controllers in the first controller group to the number of controllers in the second controller group; determining to maintain its position as the secondary controller for the controller cluster when the number of controllers in the first controller group exceeds the number of controllers in the second controller group; and promoting itself to anew primary controller for the controller cluster when the number of controllers in the second controller group exceeds the number of controllers in the first controller group.

Optionally, in any of the preceding aspects, another implementation of the aspect provides the controllers TLV in the first message and the controllers TLV in the second message each comprise a C-bit set to a first value, and wherein the first value is zero.

Optionally, in any of the preceding aspects, another implementation of the aspect provides comparing the prior position of the primary controller in the controller cluster with the prior position of the secondary controller in the controller cluster when the number of controllers in the second controller group is equal to the number of controllers in the first controller group; and promoting itself to a new primary controller for the controller cluster when the prior position of the secondary controller in the controller cluster is lower than the prior position of the primary controller in the controller cluster.

Optionally, in any of the preceding aspects, another implementation of the aspect provides receiving a third message from the NE when the secondary controller has determined to maintain its position as the secondary controller, wherein the third message includes a third controllers TLV structure identifying a primary controller from the first controller group as the new primary controller.

A fifth aspect relates to a secondary controller in a controller cluster including a primary controller and the secondary controller, comprising: a processor configured to detect a failure of a communication link between the primary controller and the secondary controller; a transmitter coupled to the processor and configured to transmit a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the failure; and a receiver coupled to the transmitter and configured to receive a second message from the network element, wherein the second message includes a second controllers TLV structure that indicates a status of the primary controller, wherein the secondary controller for the controller cluster is configured to determine to maintain its position as the secondary controller when the status of the primary controller is active.

Optionally, in any of the preceding aspects, another implementation of the aspect provides the indication in the controllers TLV structure that the secondary controller is attempting to promote itself comprises a C-bit set to a first value and a position bit set to a second value.

Optionally, in any of the preceding aspects, another implementation of the aspect provides the first value is zero and the second value is one.

Optionally, in any of the preceding aspects, another implementation of the aspect provides the controllers TLV structure further identifies a number of controllers connecting the secondary controller, an old position of the secondary controller, a priority of the secondary controller, and an identifier (ID) of the secondary controller.

Optionally, in any of the preceding aspects, another implementation of the aspect provides one or more of the first message, the second message, and the open message are exchanged over an information channel.

Optionally, in any of the preceding aspects, another implementation of the aspect provides one or more of the primary controller and the secondary controller is a path computational element (PCE), and wherein the network element is a path computational client (PCC).

Optionally, in any of the preceding aspects, another implementation of the aspect provides transmitting an open message to the network element to indicate a capability for high availability of controllers (HAC).

Optionally, in any of the preceding aspects, another implementation of the aspect provides the open message includes an open object, wherein the open object includes a controller capability TLV structure, wherein the controller capability TLV structure includes a second C-bit, wherein the second C-bit is set to a first value to indicate the secondary controller is a controller, wherein the first value is one.

A sixth aspect relates to a secondary controller in a controller cluster including a primary controller and the secondary controller, comprising: a processor configured to detect a potential failure of the primary controller; a transmitter coupled to the processor and configured to transmit a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the potential failure; a receiver coupled to the transmitter and configured to receive a second message from the network element indicating that the primary controller is still active; wherein the processor is further configured to promote the secondary controller to the new primary controller for the controller cluster when the receiver has failed to receive the secondary message indicating that the primary controller is still active within a predetermined period of time.

Optionally, in any of the preceding aspects, another implementation of the aspect provides the indication in the controllers TLV structure that the secondary controller is attempting to promote itself comprises a C-bit set to a first value and a position field set to a second value.

Optionally, in any of the preceding aspects, another implementation of the aspect provides the first value is zero and the second value is one.

Optionally, in any of the preceding aspects, another implementation of the aspect provides removing an information channel between the secondary controller and the network element and establishing a controller channel between the secondary controller and the network element after the secondary controller has promoted itself to the new primary controller for the controller cluster.

Optionally, in any of the preceding aspects, another implementation of the aspect provides transmitting, to the network element, a third message including an updated controllers TLV structure, the updated controllers TLV structure comprising a C-bit set to a first value and a position field set to a second value to indicate that the secondary controller is the new primary controller, wherein the first value is one and the second value is one.

Optionally, in any of the preceding aspects, another implementation of the aspect provides the first message is transmitted over an information channel, and wherein the third message is transmitted over the information channel or a control channel.

Optionally, in any of the preceding aspects, another implementation of the aspect provides one or more of the primary controller and the secondary controller is a path computational element (PCE), and wherein the network element is a path computational client (PCC).

A seventh aspect relates to a network element in communication with a primary controller and a secondary controller in a controller cluster, comprising: a receiver configured to: receive a first message from the secondary controller, wherein the first message includes a controllers type length value (TLV) structure with an indication that the secondary controller is attempting to promote itself to a new primary controller for the controller cluster based on detection of a failure of a communication link between the primary controller and the secondary controller; and receive a second message from the primary controller, wherein the second message includes a second controllers type length value (TLV) structure with an indication that the primary controller is still active; a transmitter coupled to the receiver and configured to: transmit the first message to the primary controller; and transmit the second message to the secondary controller to prevent the secondary controller from promoting itself to the new primary controller.

Optionally, in any of the preceding aspects, another implementation of the aspect provides the indication in the controllers TLV structure that the secondary controller is attempting to promote itself comprises a C-bit set to a first value and a position bit set to a second value, wherein the first value is zero and the second value is one.

Optionally, in any of the preceding aspects, another implementation of the aspect provides the indication in the second controllers TLV structure that the primary controller is still active comprises a second C-bit set to a first value and a second position field set to a second value, wherein the first value is one and the second value is one.

An eighth aspect relates to a secondary controller in a controller cluster, comprising: a processor configured to detect a failure that divides the controller cluster into a first controller group and a second controller group, wherein the second controller group includes the secondary controller; a transmitter coupled to the processor and configured to transmit a first message to a network element (NE) in communication with each controller in the controller cluster, wherein the first message includes a controllers type length value (TLV) structure identifying the secondary controller as an intended primary controller for the second controller group, a total number of controllers in the second controller group, and a prior position of the secondary controller in the controller cluster; a receiver coupled to the transmitter and configured to receive a second message from the NE, wherein the second message includes a second controllers TLV structure identifying a primary controller from the first controller group as an intended primary controller for the first controller group, a number of controllers in the first controller group, and a prior position of the primary controller in the controller cluster; wherein the processor is further configured to: compare the number of controllers in the first controller group to the number of controllers in the second controller group; determine to maintain the secondary controller's position as the secondary controller for the controller cluster when the number of controllers in the first controller group exceeds the number of controllers in the second controller group; and promote the secondary controller to a new primary controller for the controller cluster when the number of controllers in the second controller group exceeds the number of controllers in the first controller group.

Optionally, in any of the preceding aspects, another implementation of the aspect provides the controllers TLV in the first message and the controllers TLV in the second message each comprise a C-bit set to a first value, and wherein the first value is zero.

Optionally, in any of the preceding aspects, another implementation of the aspect provides the processor is further configured to compare the prior position of the primary controller in the controller cluster with the prior position of the secondary controller in the controller cluster when the number of controllers in the second controller group is equal to the number of controllers in the first controller group, and wherein the secondary controller is configured to promote itself to a new primary controller for the controller cluster when the prior position of the secondary controller in the controller cluster is lower than the prior position of the primary controller in the controller cluster.

A ninth aspect relates to a system, comprising: a primary controller in a controller cluster; a secondary controller in the controller cluster, wherein the secondary controller comprises the secondary controller in any of the disclosed embodiments; and a network element, wherein the network element comprises the network element in any of the disclosed embodiments.

A tenth aspect relates to a non-transitory computer readable medium comprising a computer program product for use by a secondary controller or a network element, the computer program product comprising computer executable instructions stored on the non-transitory computer readable medium such that when executed by a processor cause the secondary controller to perform the method in any of the disclosed embodiments.

An eleventh aspect relates to a means for network communication, comprising: receiving means configured to receive one or more messages; transmission means coupled to the receiving means, the transmission means configured to transmit the one or more messages; storage means coupled to at least one of the receiving means or the transmission means, the storage means configured to store instructions; and processing means coupled to the storage means, the processing means configured to execute the instructions stored in the storage means to perform the method in any of the disclosed embodiments.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
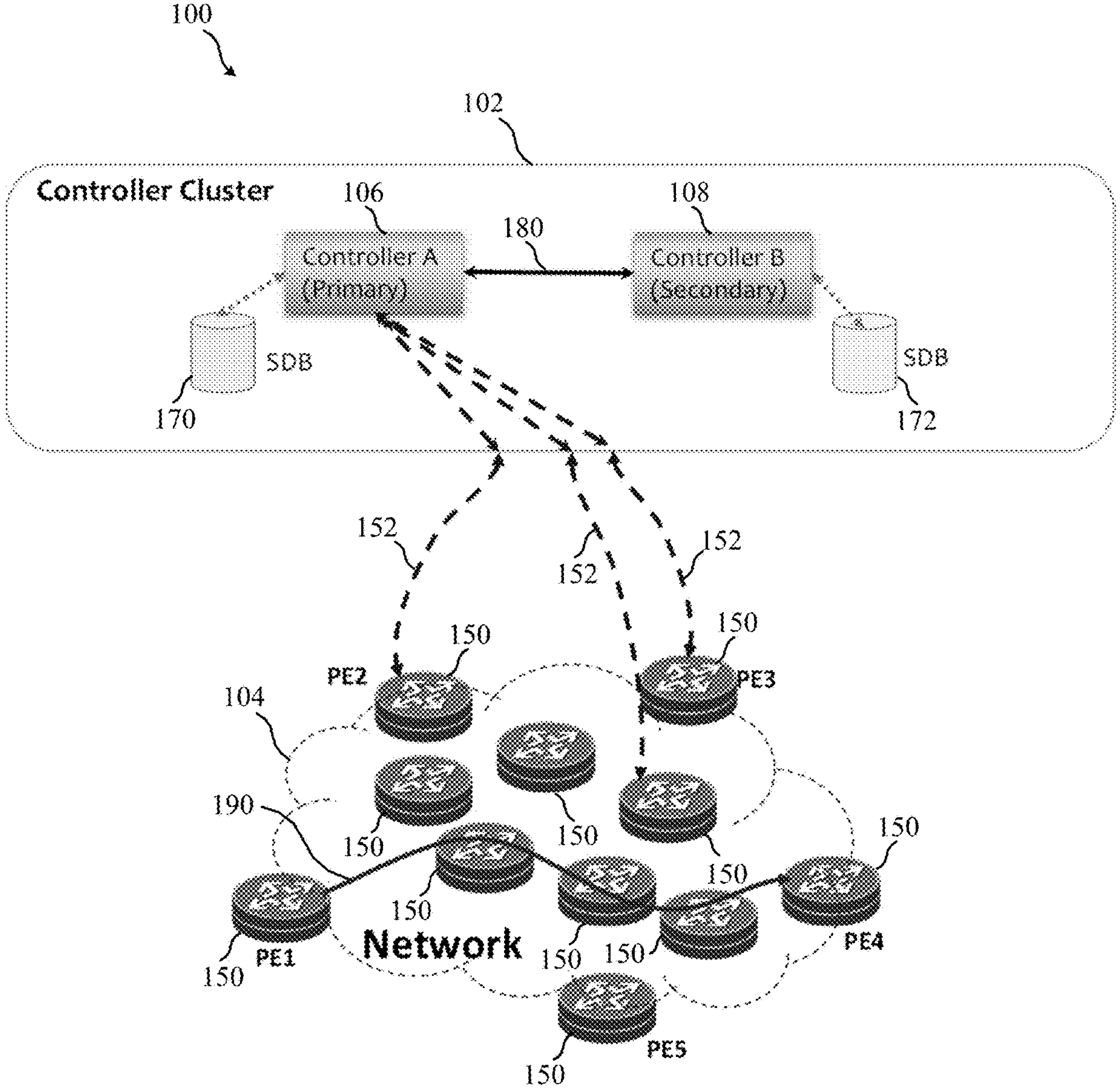
FIG. 1 is a schematic diagram of network architecture.

FIG. 1 is a schematic diagram of network architecture 100. As shown, the network architecture 100 includes a controller cluster 102 configured to manage a network 104. In FIG. 1, the controller cluster 102 comprises a primary controller 106 and a secondary controller 108. In an embodiment, one or both of the primary controller 106 and the secondary controller 108 is a path computational element (PCE) configured to implement a path computational element communication protocol (PCEP). PCEP is described in detail in Internet Engineering Task Force (IETF) document Request for Comments (RFC) 5440 entitled "Path Computation Element (PCE) Communication Protocol (PCEP)" by J. P. Vasseur, et al., published March 2009. For the purposes of discussion, the primary controller 106 has been labeled Controller A and the secondary controller 108 has been labeled Controller B.

The network 104 includes a plurality of network elements (NEs) 150. The network elements 150 may be a router, switch, or other communication device configured to send and receive data, information, packets, and so on. The network elements 150 may operate as an ingress edge, an egress edge, or an intermediate node depending on their position within the topology of network 104. For the purposes of discussion, some of the network elements 150 have been labeled with a provider edge (PE) number, e.g., PE1, PE2, PE3, PE4, and PE5 to identify that they are edge devices.

In normal operations, the primary controller 106 controls the network 104 (e.g., manages each of the network elements 150) through a control channel 152 (e.g., a PCEP session) established between the controller cluster 102 and one or more of the network elements 150. The primary controller 106 sends instructions to the network elements 150 through the control channel 152 to, for example, establish a tunnel 190 traversing the network 104 from the network element 150 labeled PE1 to the network element 150 labeled PE4. The primary controller 106 also stores the instructions and/or a current status of the network 104 in a status database (SDB) 170.

In an embodiment, the controllers in the controller cluster 102 are coupled to communicate with every network element 150 in the network 104. That is, in an embodiment the controllers in the controller cluster 102 are in direct communication, and have a session established with, each element. In an embodiment, the controllers in the controller cluster 102 are only coupled to some of the network elements 150 in the network (e.g., an ingress edge and an egress edge).

The primary controller 106 is coupled to the secondary controller 108 through connection 180. The connection 180 may be a wired link, a wireless link, or some combination thereof. The connection 180 permits the primary controller 106 to exchange information with the secondary controller 108. In an embodiment, the primary controller 106 is able to synchronize the instructions and/or the current state of the network 104 with the secondary controller 108, which stores this information in SDB 172. Despite having access to the instructions, the secondary controller 108 does not send the instructions to any of the network elements 150. Rather, the secondary controller 108 in the controller cluster 102 functions as a backup in case the primary controller 106 and/or the connection 180 experiences a failure (a.k.a., fails, becomes inactive, dies, malfunctions, ceases to operate, halts communication, etc.). In such a circumstance, the primary controller 106 may not be able to effectively control or manage the network 104 any longer. Thus, one function of the secondary controller 108 is to provide redundancy.

When the primary controller 106 fails, the secondary controller 108 promotes itself to be the new primary controller and begins to control or manage the network 104. That is, the secondary controller 108 starts to send instructions to the network elements 150 through the control channel 152 established between the controller cluster 102 and the network elements 150. In an embodiment, the secondary controller 108 stores the instructions and/or the current status of the network 104 in the SDB 172.

Figure 2:
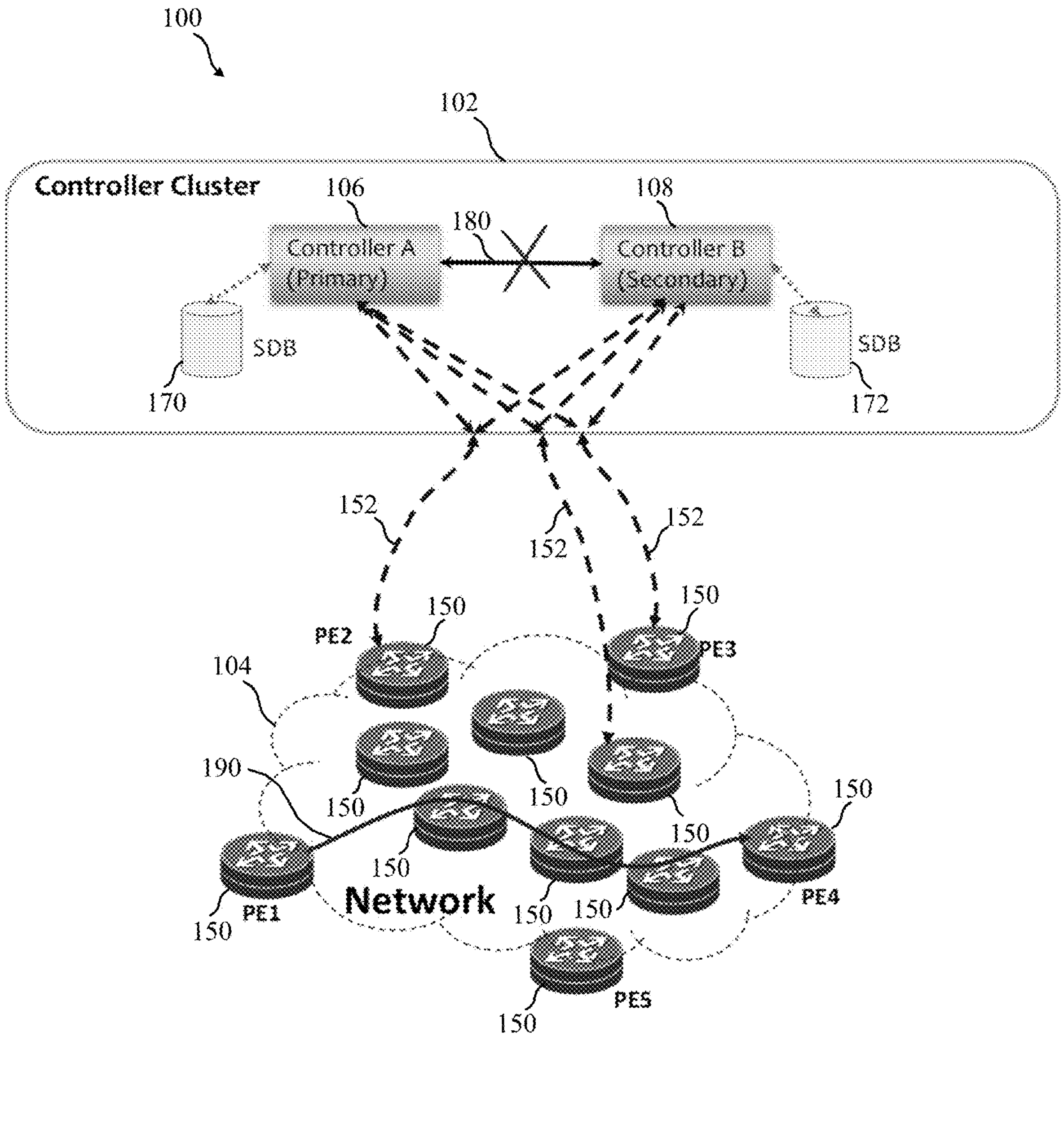
FIG. 2 is a schematic diagram of network architecture depicting a failure in the connection between the primary controller and the secondary controller.

FIG. 2 is a schematic diagram of the network architecture 100 depicting a failure in the connection 180 between the primary controller 106 and the secondary controller 108. Because of the failed connection 180, the secondary controller 108 may no longer receive a heartbeat message (or other expected communications) from the primary controller 106. Therefore, the secondary controller 108 may incorrectly determine that the primary controller 106 has experienced a failure even though the primary controller 106 is still alive and active. As such, two controllers, namely primary controller 106 and secondary controller 108, may each try to control or manage the network 104 at the same time through the control channel 152. If the instructions from the primary controller 106 conflict with the instructions from the secondary controller 108, undesirable results may be experienced in the network 104. Thus, in such a situation the secondary controller should not have promoted itself to the new primary controller controlling the network.

Figure 3:
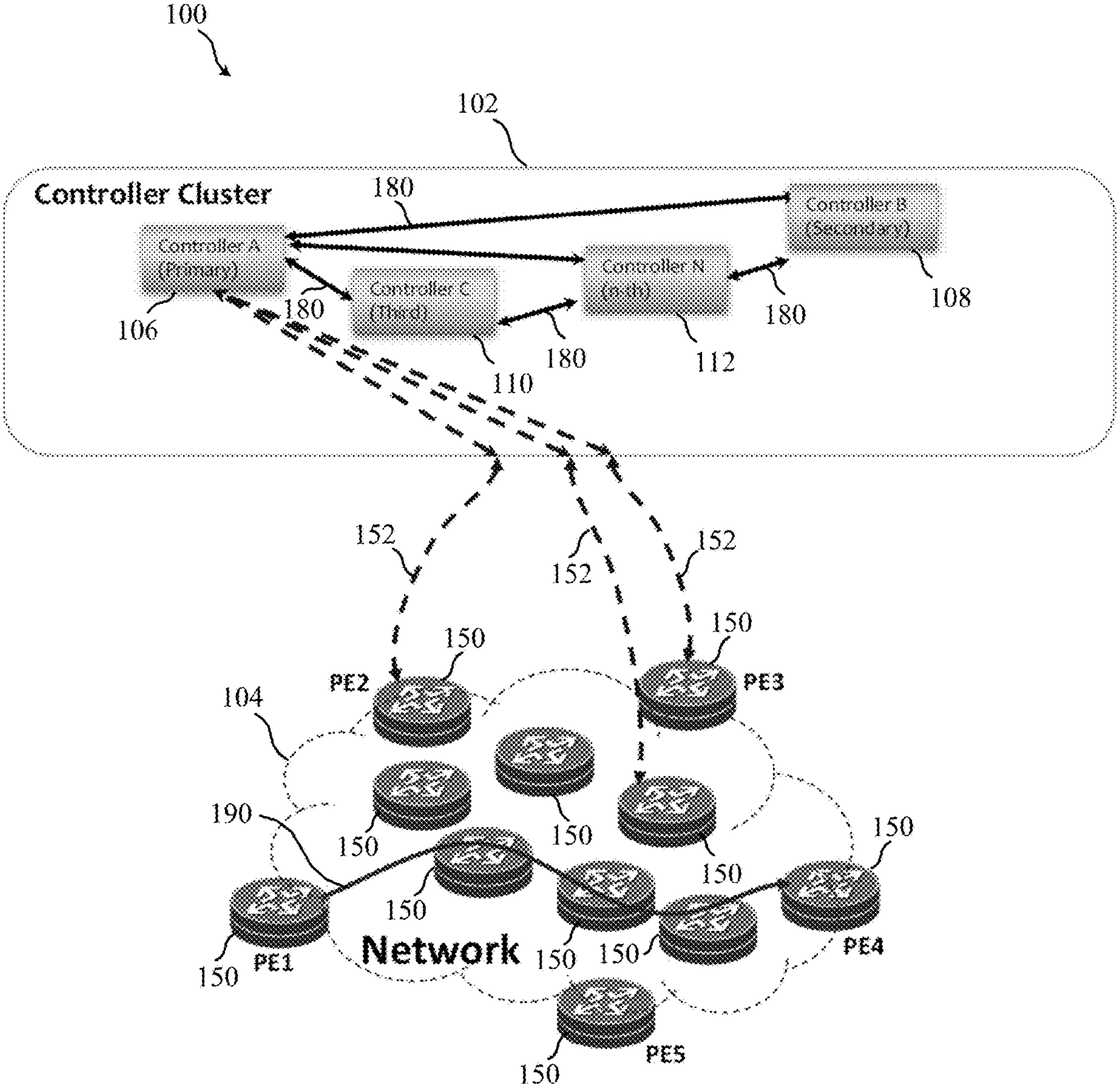
FIG. 3 is a schematic diagram of network architecture where the controller cluster includes more than two controllers

FIG. 3 is a schematic diagram of network architecture 100 where the controller cluster 102 includes more than two controllers (e.g., n controllers, where n>2). As shown in FIG. 3, the controller cluster 102 includes the primary controller 106, the secondary controller 108, a third controller 110, and an n-th controller 112. While four controllers are shown, the controller cluster 102 may include a different number of controllers in practical applications.

In normal operations, the primary controller 106 controls the network 104 (e.g., manages each of the network elements 150) through the control channel 152 established between the controller cluster 102 and one or more of the network elements 150. The primary controller 106 sends instructions to the network elements 150 through the control channel 152 to, for example, establish the tunnel 190 traversing the network 104 from the network element 150 labeled PE1 to the network element 150 labeled PE4.

The primary controller 106, the secondary controller 108, the third controller 110, and the n-th controller 112 are coupled to each through connections 180. Each of the connections 180 may be a wired link, a wireless link, or some combination thereof. The connections 180 permit the primary controller 106 to exchange information with the secondary controller 108, the third controller 110, and the n-th controller 112.

The primary controller 106 stores the instructions and/or a current status of the network 104 in a status database (not shown, but similar to SDB 170 in FIG. 1). In an embodiment, the primary controller 106 is able to synchronize the instructions and/or the current state of the network 104 with the secondary controller 108, the third controller 110, and the n-th controller 112, each of which stores this information in their respective status database (not shown, but similar to SDB 172 in FIG. 1).

Despite having access to the instructions, the secondary controller 108, the third controller 110, and the n-th controller 112 do not send the instructions to any of the network elements 150. Rather, the secondary controller 108, the third controller 110, and the n-th controller 112 in the controller cluster 102 each function as a backup in case the primary controller 106 and/or the connections 180 experience a failure (a.k.a., fails, becomes inactive, dies, malfunctions, ceases to operate, halts communication, etc.). In such a circumstance, the primary controller 106 may not be able to effectively control or manage the network 104 any longer. Thus, one function of the secondary controller 108, the third controller 110, and the n-th controller 112 is to provide redundancy.

When the primary controller 106 fails, the secondary controller 108 promotes itself to be the new primary controller and begins to control or manage the network 104. That is, the secondary controller 108 starts to send instructions to the network elements 150 through the control channel 152 established between the controller cluster 102 and the network elements 150. In an embodiment, the secondary controller 108 stores the instructions and/or the current status of the network 104 in the SDB 172.

Figure 4:
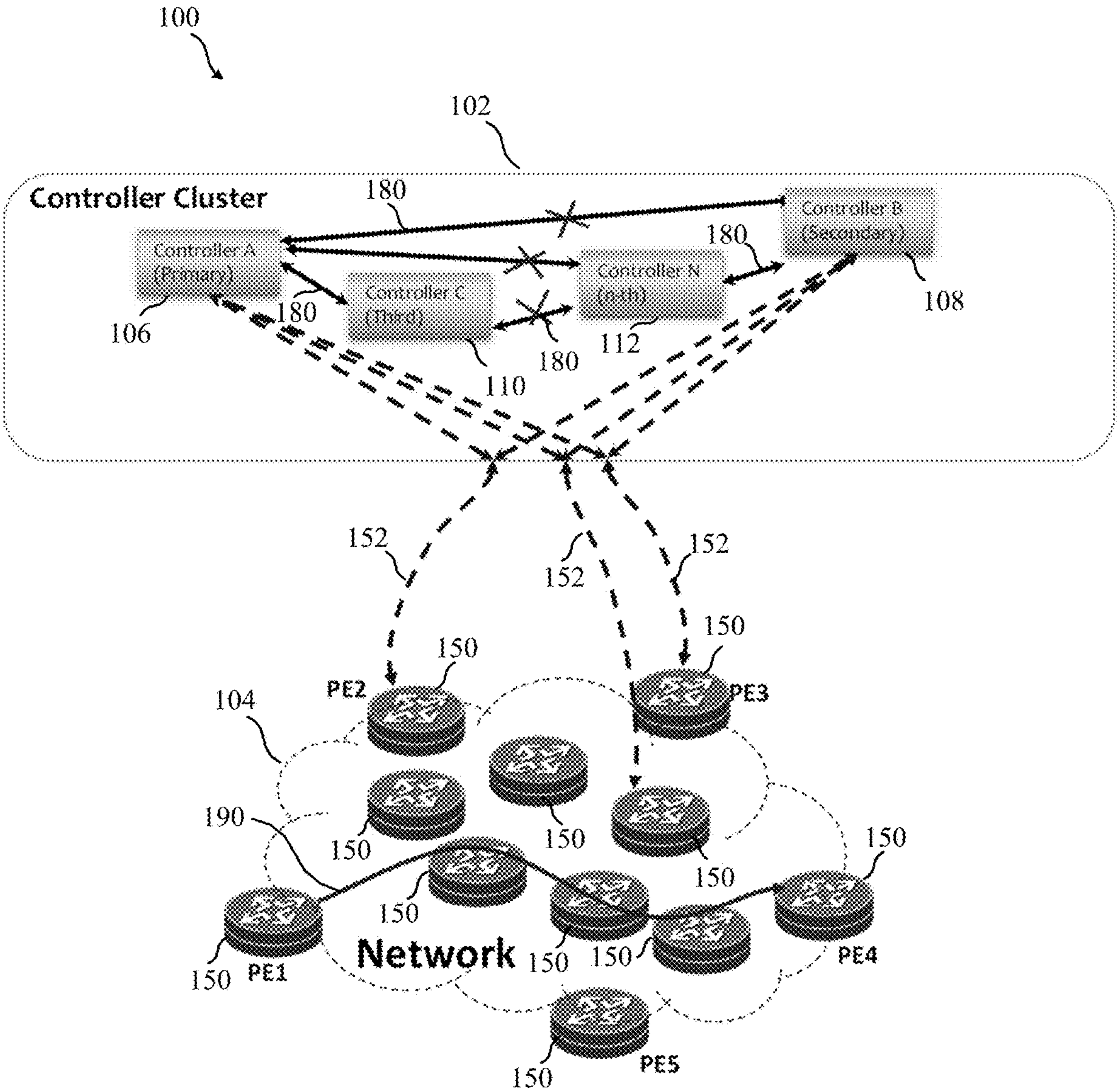
FIG. 4 is a schematic diagram of the network architecture depicting multiple failures in the controller cluster.

FIG. 4 is a schematic diagram of the network architecture 100 depicting multiple failures in the controller cluster 102. For example, there exists a failure in the connection 180 between the primary controller 106 and the secondary controller 108, a failure in the connection 180 between the primary controller 106 and the n-th controller 112, and a failure in the connection 180 between the third controller 110 and the n-th controller 112. The multiple failures effectively split the controller cluster 102 into separate groups of controllers. For example, the primary controller 106 and the third controller 110 are still in communication over one of the connections 180 and form a first group. The secondary controller 108 and the n-th controller 112 are still in communication over one of the connections 180 and therefore form a second group, which is not in communication with first group. Because of the failed connections 180, the secondary controller 108 and the n-th controller 112 in the second group may no longer receive a heartbeat message (or other expected communications) from the primary controller 106 in the first group.

When multiple failures happen in the controller cluster 102, the group with the maximum number of controllers is responsible for controlling the network. For example, the group with the most controllers becomes the primary group of controllers for the controller cluster 102. Thereafter, the primary group of controllers elects a new primary controller, a new secondary controller, and so on.

However, a separated group of controllers cannot determine whether their group has the largest number of controllers due to the failures. That is, each group of controllers has no way of determining how many controllers are in the other groups. Therefore, as shown in FIG. 4, two or more groups of controllers may be elected or determined to control the network 104 at the same time. For example, the first group of controllers, which includes the primary controller 106 and the third controller 110, may determine that the first group is responsible for controlling the network 104, and may elect controller 106 as the new primary controller for the controller cluster 102. At the same time, the second group of controllers, which includes the second controller 108 and n-th controller 112, may determine that the second group is responsible for controlling the network 104, and may elect (or promote) the second controller 108 as the new primary controller for the controller cluster 102. Such a circumstance would lead to undesirable results.

Disclosed herein are techniques that provide path computation element protocol (PCEP) extensions transmitted through network elements (NEs). The PCEP extensions ensure separated controllers (or separated controller groups) are able to correctly determine whether a new primary controller (or new primary controller group) should be promoted when a link between the controllers, or a controller itself, has failed. Therefore, the PCEP extensions prevent more than one primary controller (or primary controller group) from managing or attempting to manage a network at the same time, which would lead to network instability, packet loss, and other undesirable results. Thus, controllers implementing the PCEP extensions disclosed herein are able to better manage a telecommunication network relative to current technology.

Figure 5:
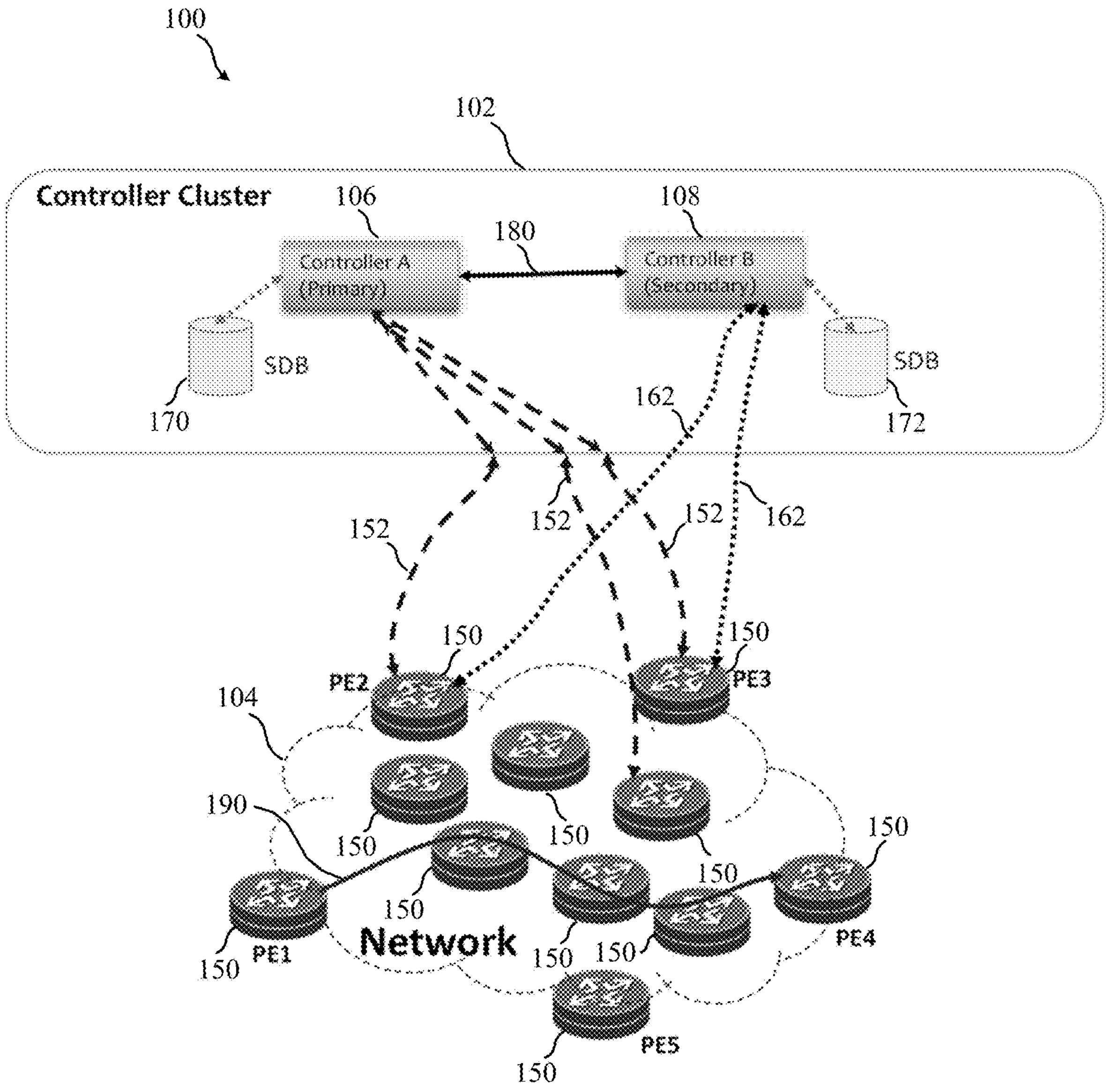
FIG. 5 is a schematic diagram of a network architecture according to disclosed embodiments.

FIG. 5 is a schematic diagram of a network architecture 100 according to disclosed embodiments. In an embodiment, the primary controller 106 and the secondary controller 108 participate in a handshake procedure with one or more of the network elements 150. The handshake procedure permits the primary controller 106, the secondary controller 108 (and any other controllers in the controller cluster 102), and the network elements 150 to advertise their support for PCEP extensions for network reliability, especially the high availability of the controllers (HAC) using PCE. In the illustrated embodiment, the primary controller 106 and the secondary controller 108 participate in the handshake procedure with the network elements 150 labeled PE2 and PE3. However, the primary controller 106 and the secondary controller 108 may participate in the handshake procedure with any number of the network elements 150 in practical applications, including all of the network elements, in the embodiments disclosed herein. As long as the primary controller 106 and the secondary controller 108 participate in the handshake procedure with at least one shared, same, or common network element 150, the embodiments disclosed herein may be implemented.

Figure 6:
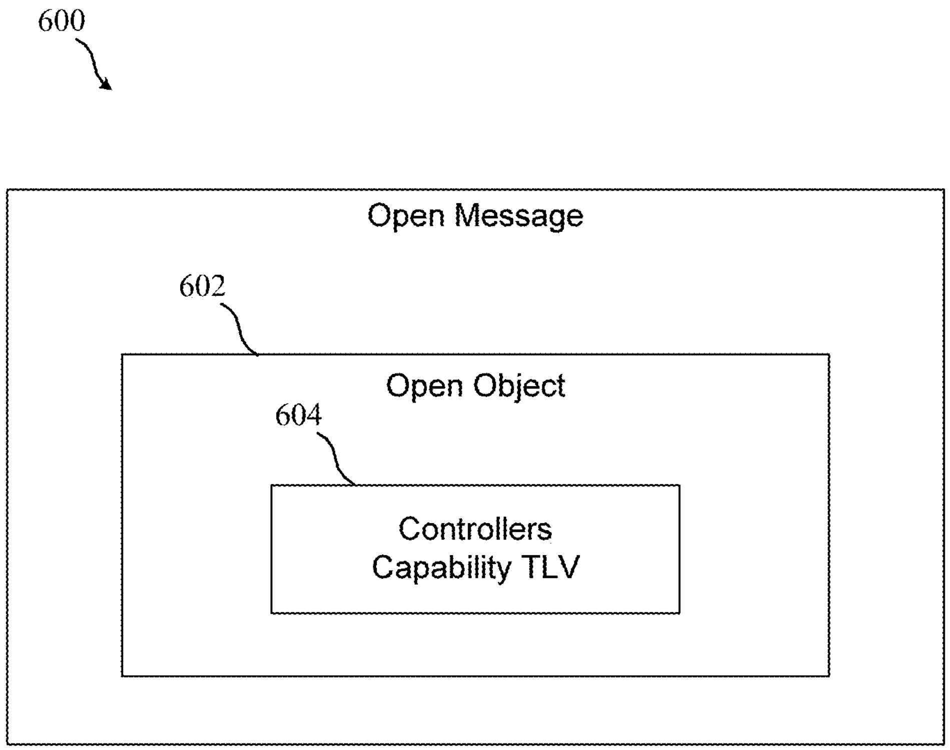
FIG. 6 is a schematic diagram of an open message utilized during the handshake procedure in an embodiment.

FIG. 6 is a schematic diagram of an open message 600 utilized during the handshake procedure in an embodiment. The open message 600 includes an open object 602, which contains or includes a controllers capability TLV structure 604 (a.k.a., a controllers capability TLV). The controllers capability TLV structure 604 is what permits the primary controller 106, the secondary controller 108, and the network elements 150 to advertise their support for PCEP extensions.

Figure 7:
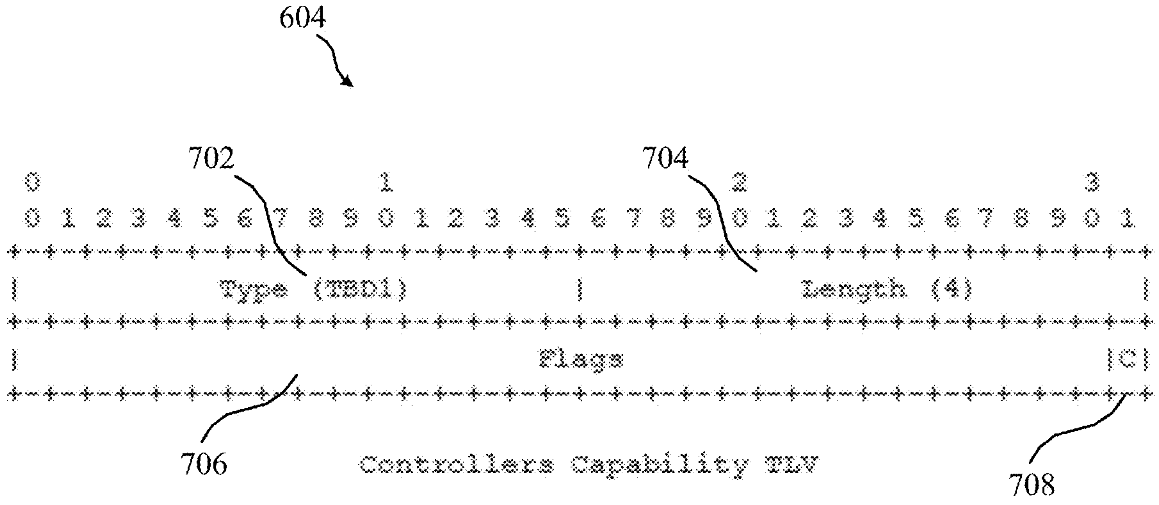
FIG. 7 is a schematic diagram of the controllers capability type-length-value (TLV) structure of FIG. 6 in further detail.

FIG. 7 is a schematic diagram of the controllers capability TLV structure 604 of FIG. 6 in further detail. As shown in FIG. 7, the controllers capability TLV structure 604 for each of the controllers includes a type field 702, a length field 704, and a flags field 706. In an embodiment, the type field 702 comprises 16 bits and is to be assigned by the Internet Assigned Numbers Authority (IANA). In an embodiment, the length field 704 comprises 16 bits and indicates the length of the value portion in octets, which is 4. In an embodiment, the flags field 706 comprises 32 bits and includes one flag bit 708. The one flag bit 708 may be designated a C-bit.

When set to a first value (e.g., one), the one flag bit 708 indicates that a PCEP speaker supports the high availability of controllers as a controller (e.g., the first controller 106, the second controller 108). When set to a second value (e.g., zero), the one flag bit 708 indicates that the PCEP speaker supports the high availability of controllers as a network element (e.g., the network element 150). Thus, the one flag bit 708 is used to determine whether a sending device (a.k.a., the PCEP speaker) is a controller or a network element. In an embodiment, the primary controller 106 and the secondary controller 108 each receive the open message 600 from the same network elements 150 (e.g., PE2 and PE3) with the one flag bit 708 set to the second value, and the network elements 150 receive the open message 600 from the same controllers (e.g., the first controller 106 and the second controller 108) with the one flag bit 708 set to the first value. The indication of whether another device supports the high availability of controllers as a controller or as a network element may be stored by the primary controller 106, the secondary controller 108, and the network elements 150.

If the primary controller 106, the secondary controller 108, or the network elements 150 receive an open message 600 without the controllers capability TLV structure 604, then these devices can determine that the sending device does not support the high availability of controllers.

Referring back to FIG. 5, following the handshake procedure the secondary controller 108 establishes an information channel 162 with the network elements 150 labeled PE2 and PE3. The information channel is used to exchange information about the controllers among the controllers through the network elements. The primary controller 106 can also set up an information channel (not shown) with the network elements 150 labeled PE2 and PE3, or the primary controller 106 can use the existing control channel 152. In the embodiment illustrated in FIG. 5, the primary controller 106 is using the control channel 152 as the information channel. Therefore, as shown in FIG. 5, the control channel 152 depicted between the primary controller 106 and the network elements labeled PE2 and PE3 may also be referred to, and simultaneously function as, as an information channel.

Figure 8:
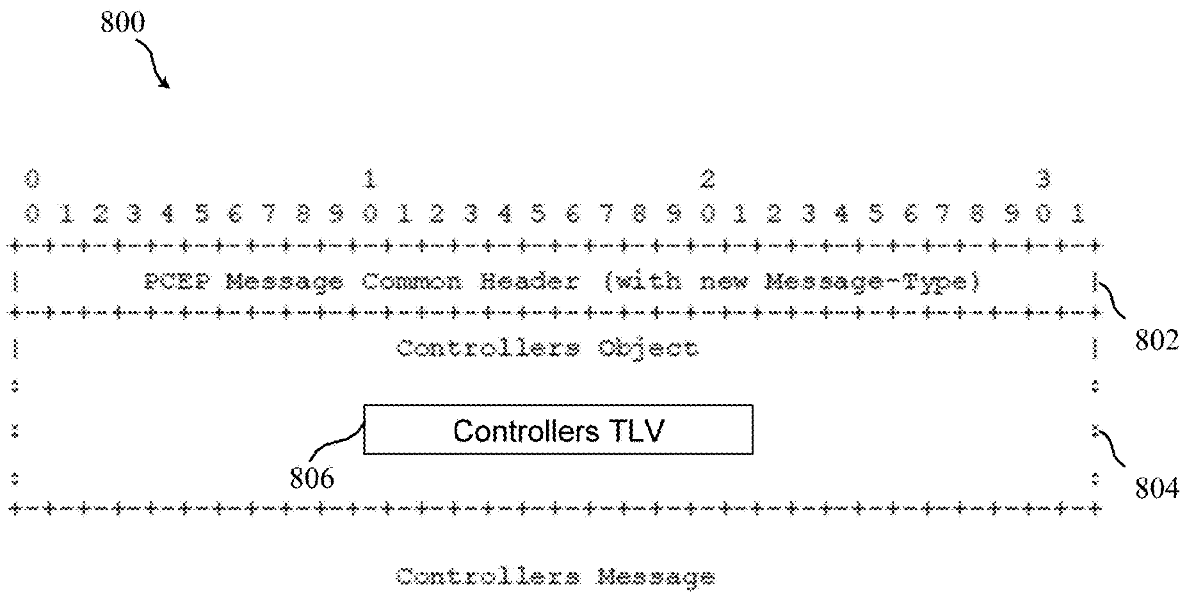
FIG. 8 is a schematic diagram of a controllers message.

FIG. 8 is a schematic diagram of a controllers message 800. The controllers message 800 comprises a common header 802 and a controllers object 804 containing a controllers TLV structure 806 (a.k.a., a controllers TLV). As will be more fully explained below, the controllers TLV structure 806 may be utilized to ensure that a separated controller (or a controller in a separated controller group) does not improperly get promoted to a new primary controller when an existing primary controller is still functioning and managing a network.

Figure 9:
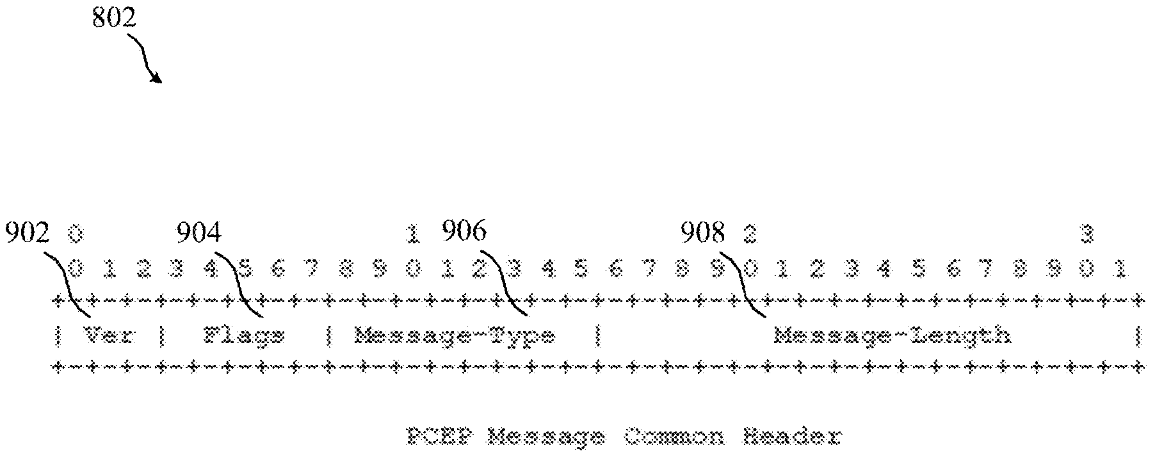
FIG. 9 is a schematic diagram of the common header of FIG. 8 in further detail.

FIG. 9 is a schematic diagram of the common header 802 of FIG. 8 in further detail. As shown, the common header 802 includes a version field 902, a flags field 904, a message-type field 906, and a message-length field 908. The version field 902 comprises 3 bits and includes a PCEP version number (e.g., the current version of PCEP is version 1). The flags field 904 comprises 5 bits. The flags field 904 may contain one or more flags. The message-type field 906 comprises 8 bits and is to be assigned by the IANA. In an embodiment, the controllers message 800 is a new message with a message type that will be assigned by IANA. In an embodiment, the controllers message 800 is an extended report message having a message type equal to 10 for Report. In an embodiment, the controllers message 800 is an extended keepalive message having a message type equal to 2 for Keepalive. The message-length field 908 comprises 16 bits and indicates a total length of the controllers message 800, in bytes, including the common header 802.

Figure 10:
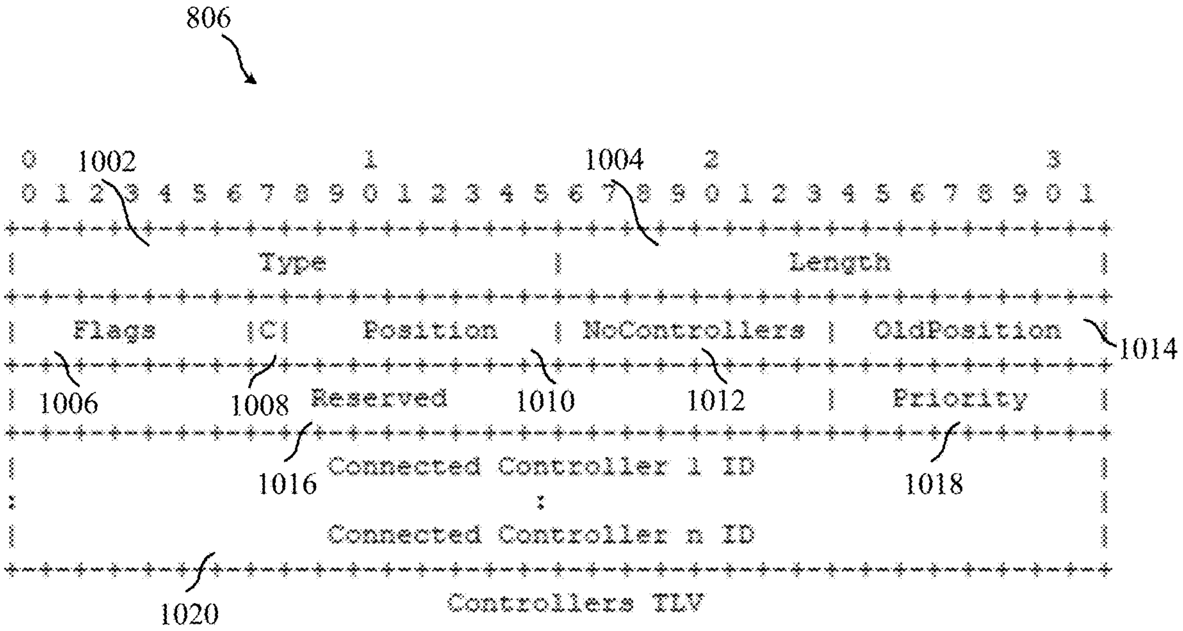
FIG. 10 is a schematic diagram of the controllers TLV structure of FIG. 8 in further detail.

FIG. 10 is a schematic diagram of the controllers TLV structure 806 of FIG. 8 in further detail. The controllers TLV structure 806 includes a type field 1002, a length field 1004, a flags field 1006 including one flag bit 1008, a position field 1010, a number of controllers (NoControllers) 1012 field, an old position field 1014, a reserved field 1016, a priority field 1018, and a connected controller identity (ID) field 1020.

The type field 1002 comprises 16 bits and is to be assigned by IANA. The length field 1004 comprises 16 bits and indicates a length of the value portion in octets. The flags field 1006 comprises 8 bits and includes one flag bit 1008. The one flag bit 1008 may be designated a C-bit.

When set to a first value (e.g., one), the one flag bit 1008 indicates that the controller originating the controllers TLV structure 806 currently has the position indicated in the position field 1010. When set to a second value (e.g., zero), the one flag bit 1008 indicates that the controller originating the controllers TLV structure 806 is intending to promote itself to the position indicated in the position field 1010. The position field 1010 comprises 8 bits and indicates that the controller originating the controllers TLV structure 806 has the current or intended position within the controller cluster 102 or in the controller group. In an embodiment, position 1 is the primary (or first) controller, position 2 is the secondary (or second) controller, position 3 is the third controller, and so on up to the n-th controller in the controller cluster 102 or controller group.

By way of example, suppose the primary controller 106 transmits a controllers message 800 containing a controllers TLV structure 806 with the one flag bit 1008 set to 1 and the value in the position field 1010 set to 1. Such a controllers TLV structure 806 would indicate to a receiving controller (e.g., the secondary controller 108) that the primary controller 106 is the active primary controller controlling the network (e.g., network 104). As an additional example, suppose the secondary controller 108 transmits a controllers message 800 containing a controllers TLV structure 806 with the one flag bit 1008 set to 0 and the value in the position field 1010 set to 1. Such a controllers TLV structure 806 would indicate to a receiving controller (e.g., the primary controller 106) that the secondary controller 108 is intending to promote itself to be the active primary controller controlling the network (e.g., network 104).

The number of controllers field 1012 comprises 8 bits and indicates the number of controllers connected to the controller that originated the controllers message 800 containing the controllers TLV structure 806 (plus one so as to be inclusive of the originating controller). The old position field 1014 comprises 8 bits and indicates the prior position (a.k.a., former position, old position, previous position) of the controller that originated the controllers message 800 containing the controllers TLV structure 806 prior to the controller cluster 102 or controller group being split.

The reserved field 1016 comprises 24 bits and is set to zero for transmission. As such, the reserved field 1016 is ignored on reception. The priority field 1018 comprises 8 bits and indicates the priority of the controller to be elected as a primary controller, which is configured. The connected controller ID field 1020 comprises multiple 32 bits and represents the IDs of the controllers at their relative position. For example, the connected controllers ID field 1020 contains the ID of controller i at position (i=1 to n) in the controller cluster or controller group.

Referring back to FIG. 5, once the information channel 162 and/or the control channel 152 have been established between the primary controller 106, the secondary controller 108, at least one network element 150 in communication with both the primary controller 106 and the secondary controller 108 (e.g., PE2 and PE3), the primary controller 106 and the secondary controller 108 exchange controllers messages 800 containing controllers TLV structures 806.

Figure 11:
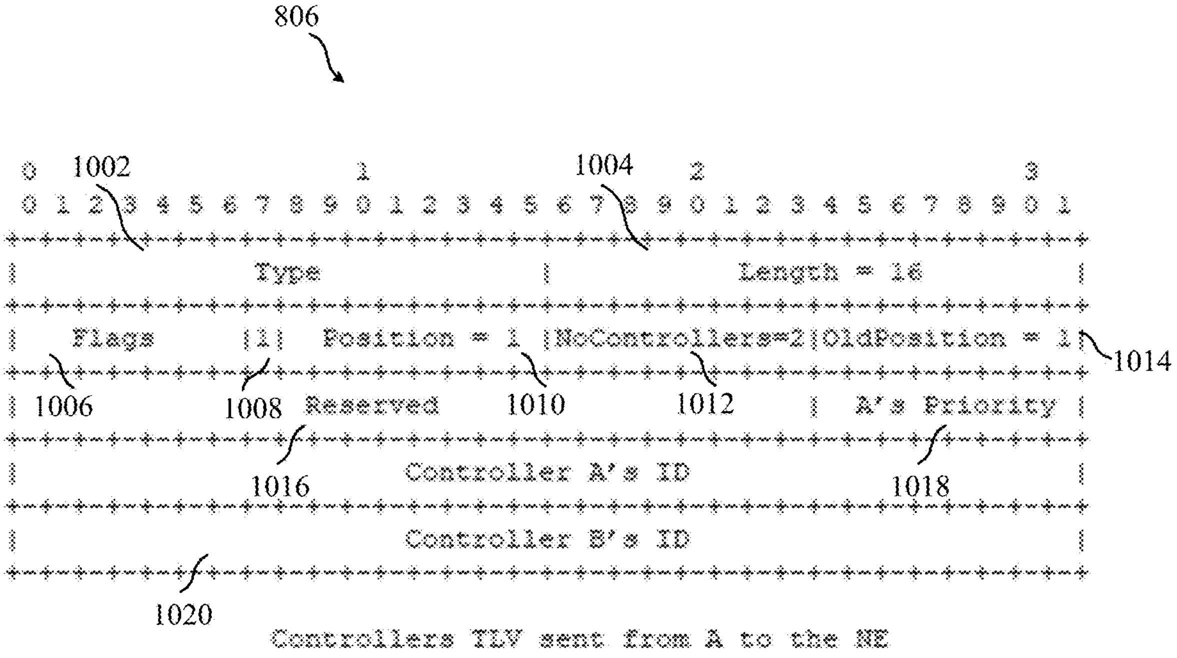
FIG. 11 is a schematic diagram of the controllers TLV structure transmitted from the primary controller to the network element using the information channel or the control channel.

FIG. 11 is a schematic diagram of the controllers TLV structure 806 transmitted from the primary controller 106 to the network element 150 labeled PE2 using the information channel 162 or the control channel 152. The controllers TLV structure 806 may also be transmitted to the network element 150 labeled PE3 to provide redundancy. As shown in FIG. 11, the one flag bit 1008 and the value in the position field 1010 have both been set to 1 to indicate that the primary controller 106 is the active primary controller for the network 104. The number of controllers field 1012 is set to indicate the number of controllers in communication with the primary controller 106. In an embodiment, the secondary controller 108 is the only other controller connected to the primary controller 106. As such, the number of controllers field 1012 is set to the value of 2, which represents one connected controller (e.g., the secondary controller) and the originating controller (e.g., the primary controller).

Because the primary controller 106 was previously the active primary controller, the old position field 1014 has been set to a value of 1. In addition, the priority field 1018 has been updated to include the primary controller's priority and the connected controller ID field 1020 has been populated with the ID of the primary controller 106 as well as the ID of each controller in communication with the primary controller 106.

Figure 12:
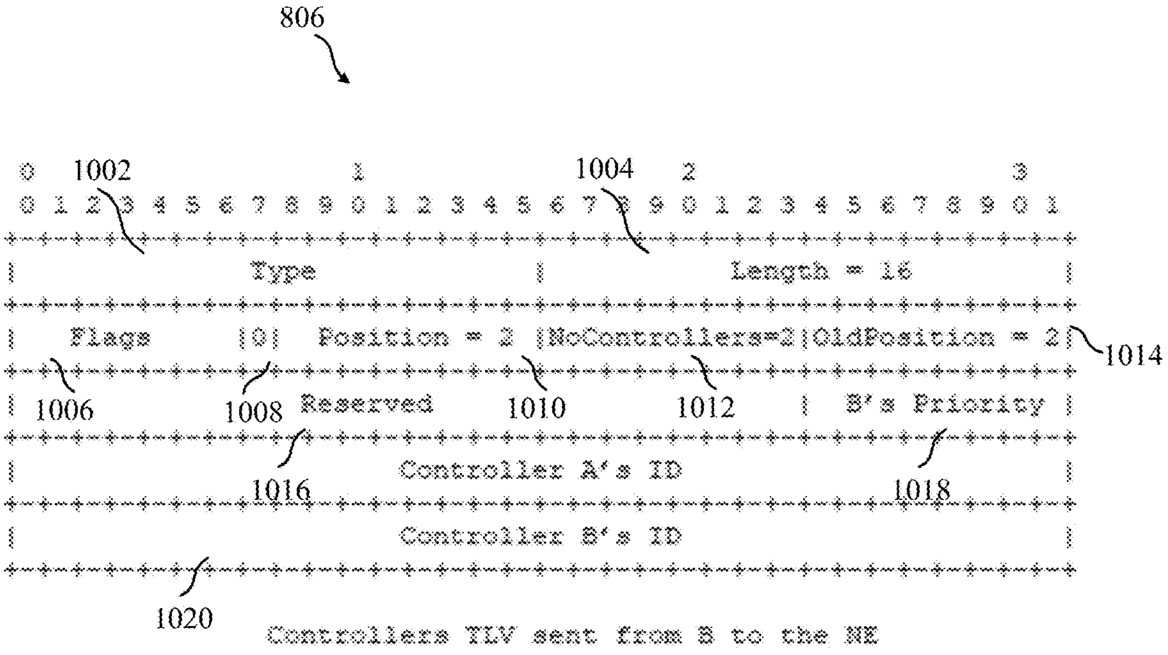
FIG. 12 is a schematic diagram of the controllers TLV structure transmitted from the secondary controller to the network element using the information channel.

FIG. 12 is a schematic diagram of the controllers TLV structure 806 transmitted from the secondary controller 108 to the network element 150 labeled PE2 using the information channel 162. The controllers TLV structure 806 may also be transmitted to the network element 150 labeled PE3 to provide redundancy. As shown in FIG. 12, the one flag bit 1008 has been set to a value of 0 to indicate that the secondary controller 108 is not the primary controller for the network 104. In addition, the position field 1010 has been set to a value of 2 to indicate that the secondary controller 108 has a second position (relative to the first position of the primary controller 106) and serves as a backup controller. The number of controllers field 1012 is set to indicate the number of controllers in communication with the secondary controller 108. In an embodiment, the primary controller 106 is the only other controller connected to the secondary controller 108. As such, the number of controllers field 1012 is set to the value of 2, which represents one connected controller (e.g., the primary controller) and the originating controller (e.g., the secondary controller).

Because the secondary controller 108 was previously a backup controller, the old position field 1014 has been set to a value of 2. In addition, the priority field 1018 has been updated to include the secondary controller's priority and the connected controller ID field 1020 has been populated with the ID of the secondary controller 108 as well as the ID of each controller in communication with the secondary controller 108.

Figure 13:
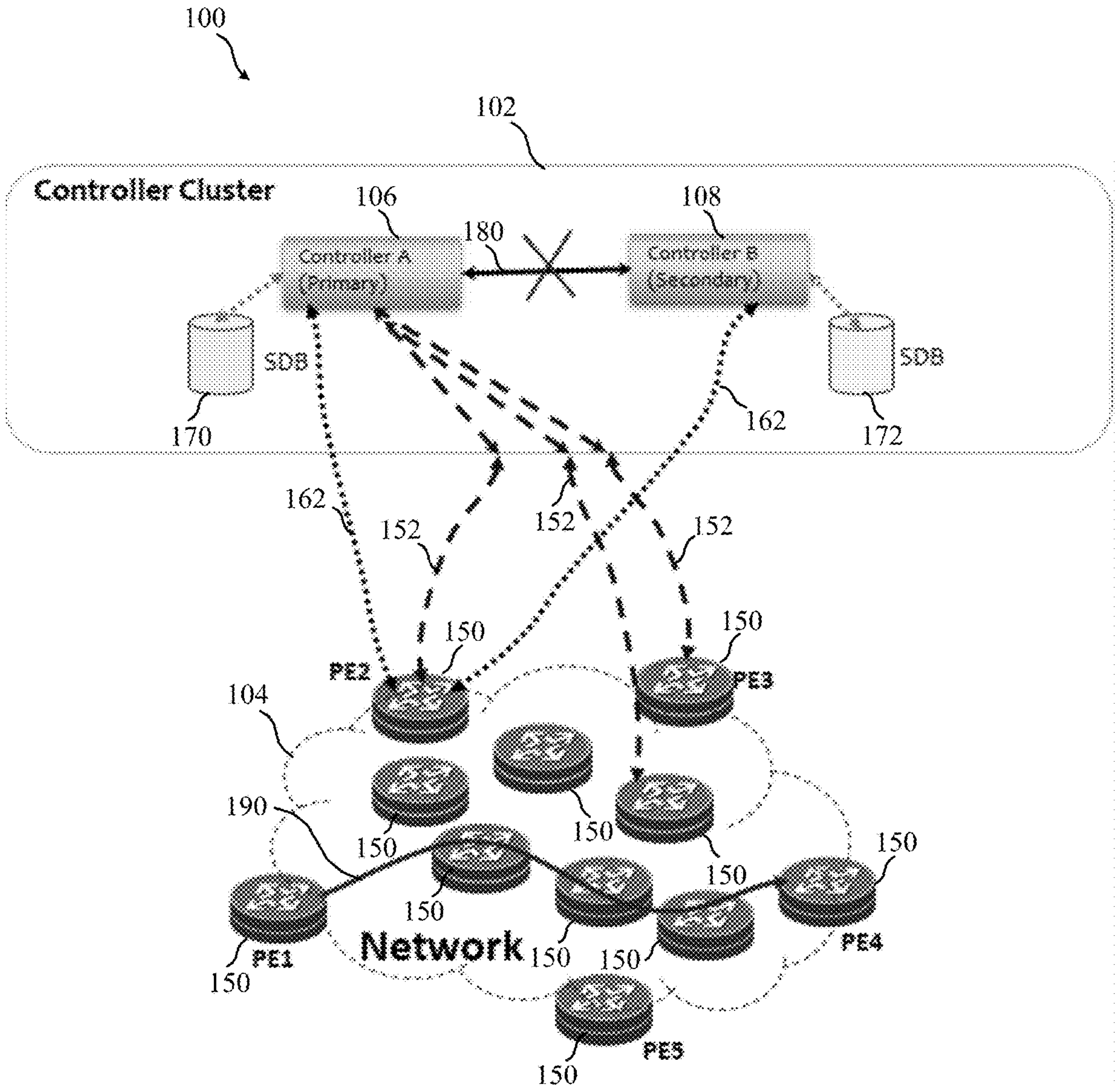
FIG. 13 is a schematic diagram of network architecture depicting a failed connection between the primary controller and the secondary controller.

FIG. 13 is a schematic diagram of network architecture 100 depicting a failed connection 180 between the primary controller 106 and the secondary controller 108. Because of the failed connection 180, the secondary controller 108 can no longer determine or confirm that the primary controller 106 is actively controlling or managing the network 104. Therefore, the secondary controller 108 implements one or more of the disclosed embodiments to ensure that the secondary controller 108 does not incorrectly promote itself to the new primary controller.

Figure 14:
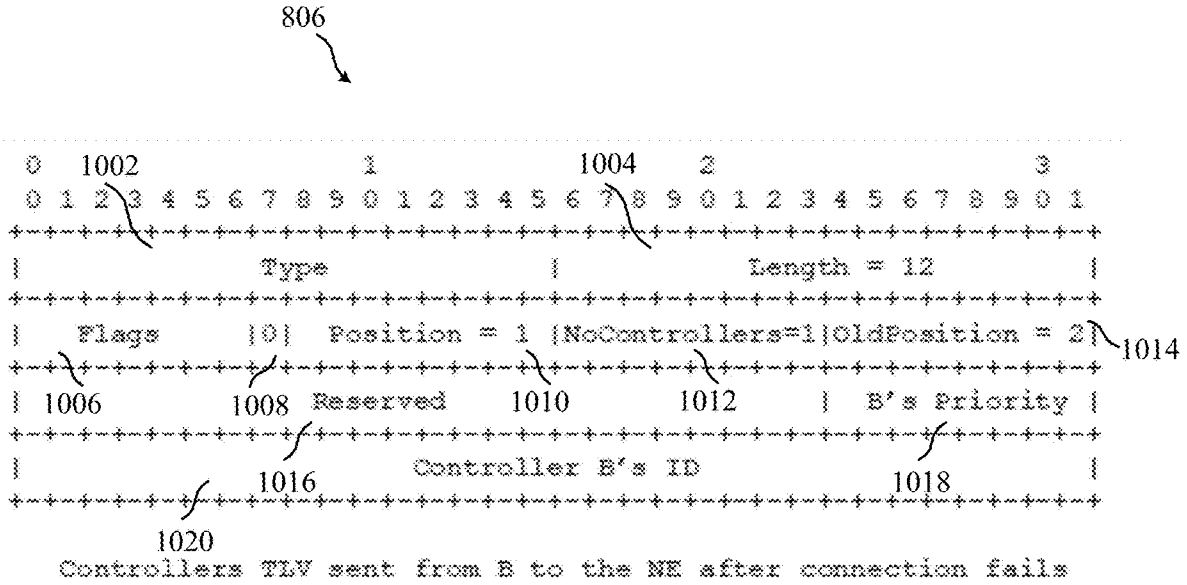
FIG. 14 is a schematic diagram of the controllers TLV structure transmitted from the secondary controller to the network element using the information channel extending between the secondary controller and the network element following detection of the connection failure.

FIG. 14 is a schematic diagram of the controllers TLV structure 806 transmitted from the secondary controller 108 to the network element 150 labeled PE2 using the information channel 162 extending between the secondary controller 108 and the network element 150 labeled PE2 following detection of the connection failure 180. As described herein, the controllers TLV structure 806 is carried in the controllers message 800. The controllers TLV structure 806 may also be transmitted to the network element 150 labeled PE3 (or additional network elements) to provide redundancy.

As shown in FIG. 14, the one flag bit 1008 has been set to a value of 0 and the position field has been set to a value of 1 to indicate that the secondary controller 108 is intending to promote itself to the new primary controller for the controller cluster 102. The number of controllers field 1012 is set to a value of 1 because the secondary controller 108 cannot be sure the primary controller 106 is still functioning. In addition, the ID of the primary controller 106 is removed from the connected controller ID field 1020.

Figure 15:
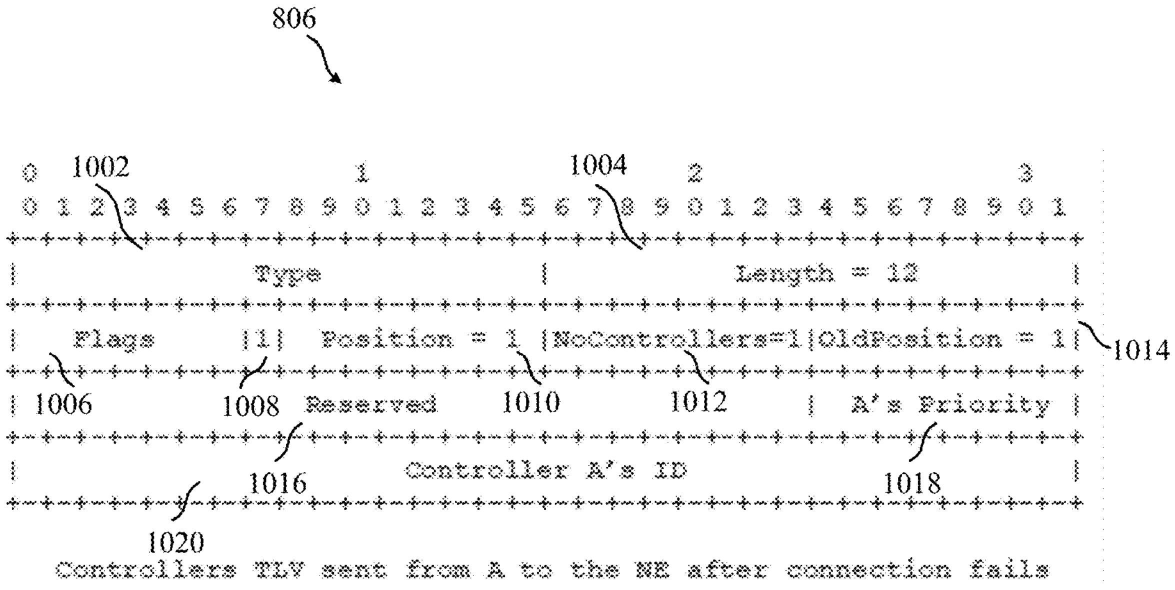
FIG. 15 is a schematic diagram of the controllers TLV structure transmitted from the primary controller to the network element using the information channel extending between the primary controller and the network element following detection of the connection failure or upon receipt of the controllers TLV structure in FIG. 14.

FIG. 15 is a schematic diagram of the controllers TLV structure 806 transmitted from the primary controller 106 to the network element 150 labeled PE2 using the information channel 162 extending between the primary controller 106 and the network element 150 labeled PE2 following detection of the connection failure 180 or upon receipt of the controllers TLV structure 806 in FIG. 14 from the network element labeled PE2. As described herein, the controllers TLV structure 806 is carried in the controllers message 800. The controllers TLV structure 806 may also be transmitted to the network element 150 labeled PE3 (or additional network elements) to provide redundancy.

As shown in FIG. 15, the one flag bit 1008 and the position field have been set to a value of 1 to indicate that the primary controller 106 is still acting as the primary controller. That is, the primary controller 106 is still managing the network 104 and, as such, the secondary controller 108 should not be promoted. The number of controllers field 1012 is set to a value of 1, and the ID of the secondary controller 108 is removed from the connected controller ID field 1020.

Once the network element 150 labeled PE2 receives the controllers message 800 containing the controllers TLV structure 806 of FIG. 15, the network element 150 transmits the the controllers message 800 to the secondary controller 108. Because the one flag bit 1008 and the position field have been set to a value of 1 to indicate that the primary controller 106 is still acting as the primary controller, the secondary controller 108 refrains from promoting itself to the new primary controller for the cluster. Thus, the situation where two controllers are trying to simultaneously manage the network 104, as illustrated in FIG. 2, is avoided.

Figure 16:
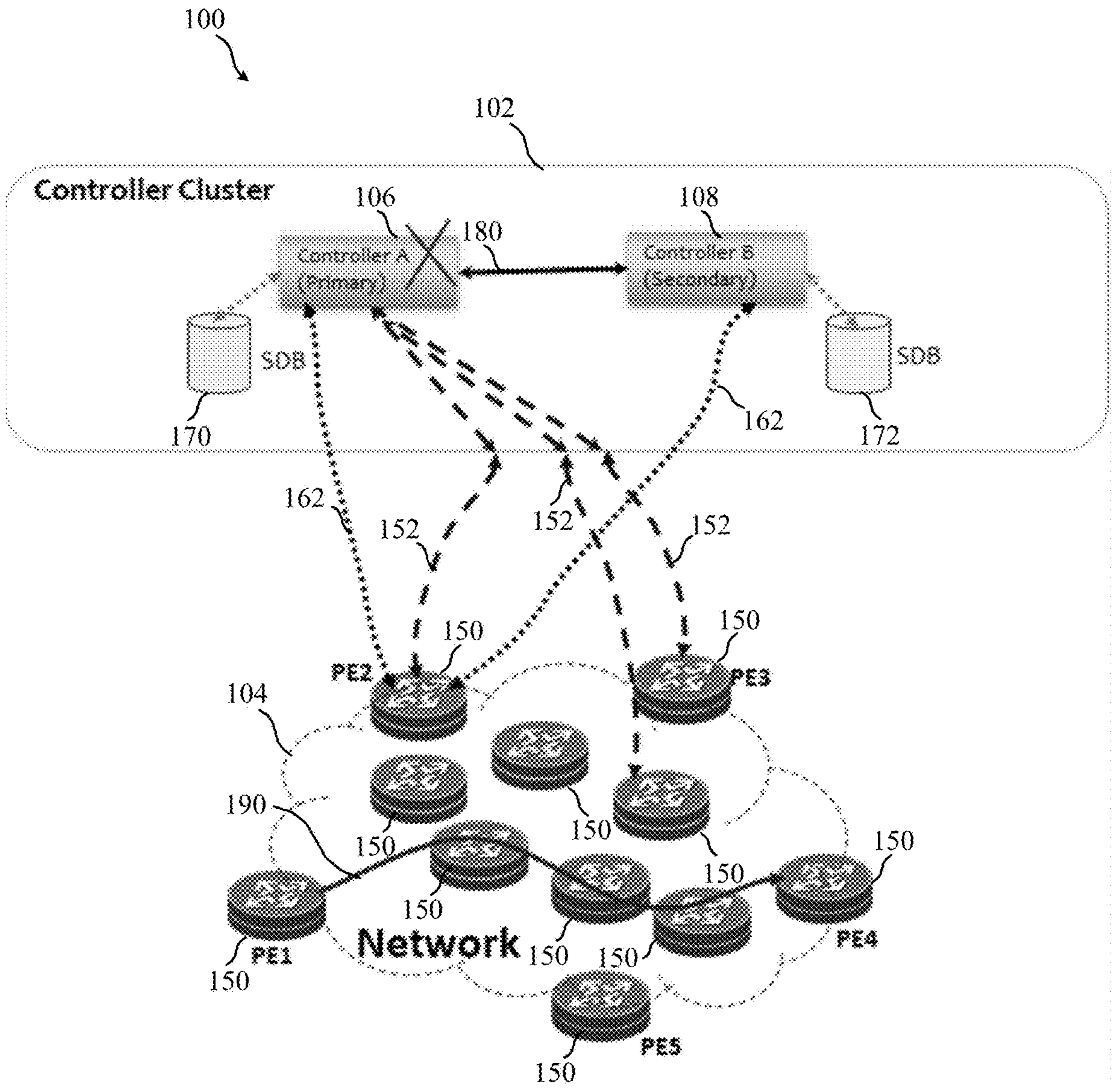
FIG. 16 is a schematic diagram of network architecture depicting a failed primary controller.

FIG. 16 is a schematic diagram of network architecture 100 depicting a failed primary controller 106. In such a scenario, the secondary controller 108 no longer receives communications from the primary controller 106 over the controller connection 180. However, the secondary controller 108 may not be able to easily determine whether the loss of communication with the primary controller 106 is due to a failure of the primary controller 106 or due to a failure of the controller connection 180. Thus, the secondary controller 108 can no longer determine or confirm that the primary controller 106 is actively controlling or managing the network 104. Therefore, the secondary controller 108 implements one or more of the disclosed embodiments to ensure that the secondary controller 108 does not incorrectly promote itself to the new primary controller.

Figure 17:
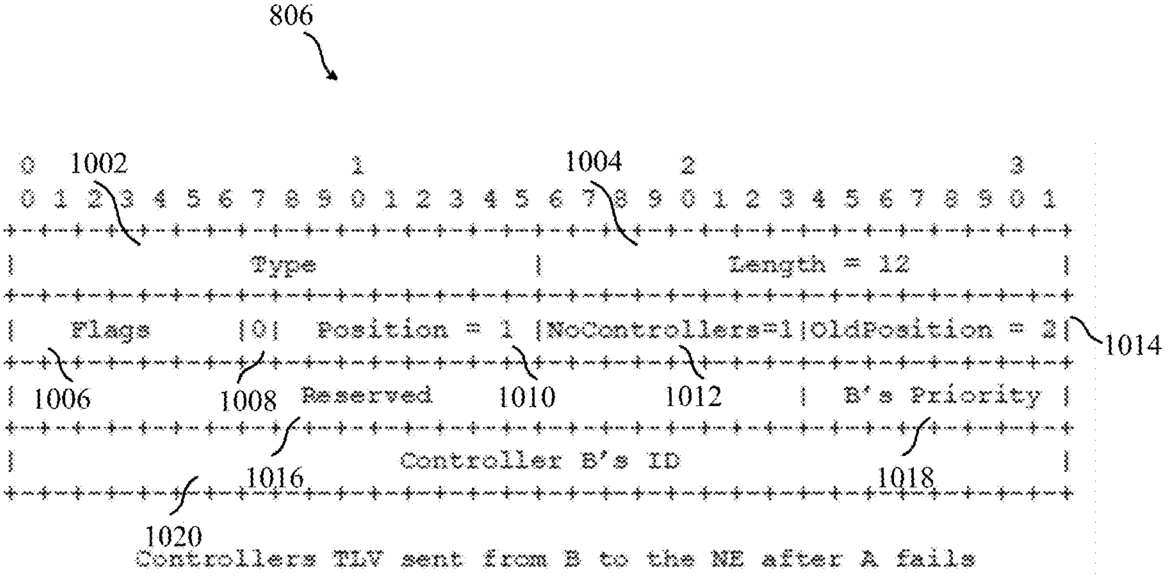
FIG. 17 is a schematic diagram of the controllers TLV structure transmitted from the secondary controller to the network element using the information channel extending between the secondary controller and the network element following detection of a potential failure of the primary controller.

FIG. 17 is a schematic diagram of the controllers TLV structure 806 transmitted from the secondary controller 108 to the network element 150 labeled PE2 using the information channel 162 extending between the secondary controller 108 and the network element 150 labeled PE2 following detection of a potential failure of the primary controller 106. As described herein, the controllers TLV structure 806 is carried in the controllers message 800. The controllers TLV structure 806 may also be transmitted to the network element 150 labeled PE3 (or additional network elements) to provide redundancy.

As shown in FIG. 17, the one flag bit 1008 has been set to a value of 0 and the position field has been set to a value of 1 to indicate that the secondary controller 108 is intending to promote itself to the new primary controller for the controller cluster 102. The number of controllers field 1012 is set to a value of 1 because the secondary controller 108 cannot be sure the primary controller 106 is still functioning. In addition, the ID of the primary controller 106 is removed from the connected controller ID field 1020.

In an embodiment, when the network element 150 labeled PE2 receives the controllers message 800 carrying the controllers TLV structure 806 of FIG. 17, the network element 150 stores the information in the controllers TLV structure 806 because the primary controller 106 has failed. That is, the network element 150 may not transmit or forward the information to any other controllers because there are no other functioning controllers in the controller cluster 102.

When the secondary controller 108 fails to receive a controllers message 800 (having a controllers TLV structure 806 similar to that in FIG. 15, above) from the network element 150 labeled PE2 within a predetermined period of time (e.g., 100 milliseconds), the secondary controller 108 determines that the primary controller 106 has, in fact, failed. As such, the secondary controller 108 promotes itself to the new primary controller for the controller cluster 102.

Figure 18:
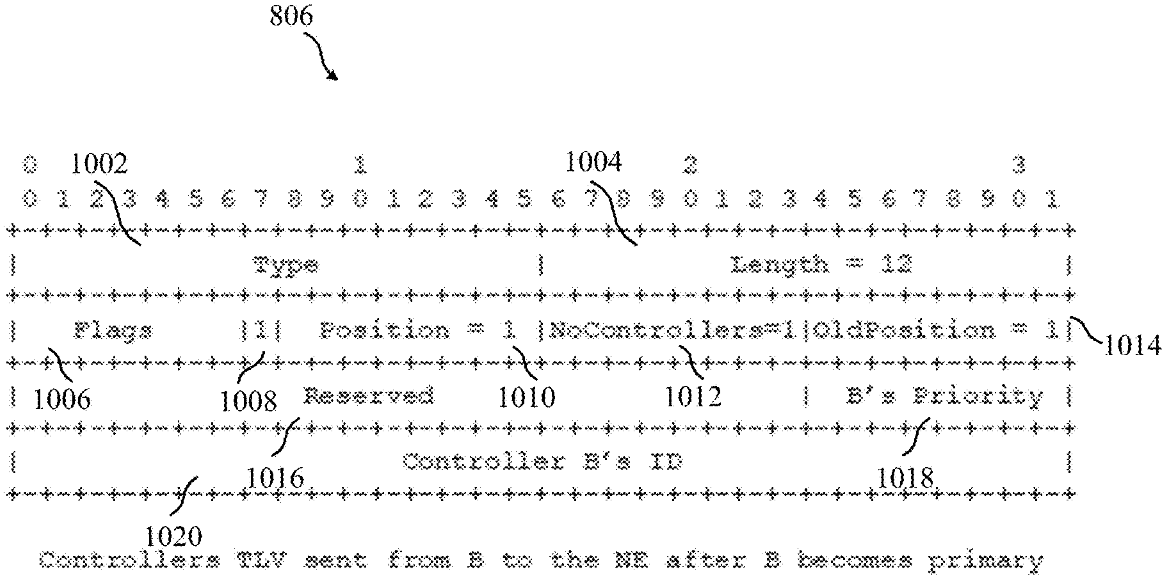
FIG. 18 is a schematic diagram of the controllers TLV structure transmitted from the secondary controller to the network element using the information channel extending between the primary controller and the network element following the secondary controller having promoted itself to the new primary controller.

FIG. 18 is a schematic diagram of the controllers TLV structure 806 transmitted from the secondary controller 108 to the network element 150 labeled PE2 using the information channel 162 extending between the primary controller 108 and the network element 150 labeled PE2 following the secondary controller 108 having promoted itself to the new primary controller. As described herein, the controllers TLV structure 806 is carried in the controllers message 800. The controllers TLV structure 806 may also be transmitted to the network element 150 labeled PE3 (or additional network elements) to provide redundancy.

As shown in FIG. 18, the one flag bit 1008 and the position field have been set to a value of 1 to indicate that the secondary controller 108 is now acting as the primary controller. That is, the secondary controller 108 has begun managing the network 104 due to the failure of the primary controller 106. The number of controllers field 1012 is set to a value of 1 (if not done already), and the ID of the primary controller 106 is removed from the connected controller ID field 1020 (if it has not already been removed).

Figure 19:
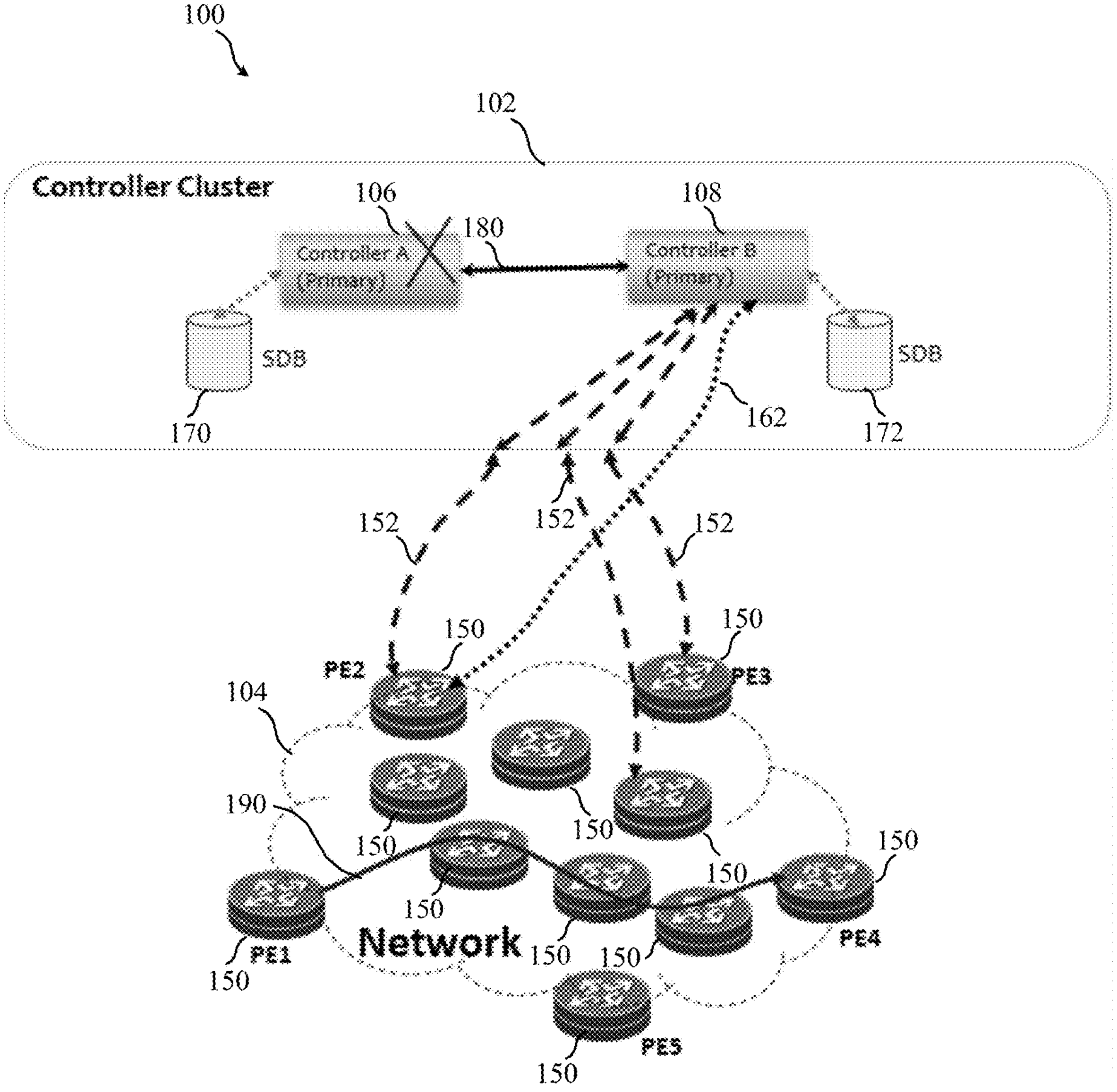
FIG. 19 is a schematic diagram of network architecture depicting a transition of the primary controller duties from the failed primary controller to the secondary controller.

FIG. 19 is a schematic diagram of network architecture 100 depicting a transition of the primary controller duties from the failed primary controller 106 to the secondary controller 108. Once the secondary controller 108 has transmitted the controllers TLV structure 806 depicted in FIG. 18 and/or promoted itself to the new active primary controller, the network elements 150 begin being managed by the secondary controller 108 through the control channels 152. Because the secondary controller 108 correctly promoted itself in this scenario, the situation where two controllers are trying to simultaneously manage the network 104 is avoided.

Unlike the embodiments depicted in FIGS. 13 and 16 where the controller cluster 102 has only two controllers, in some embodiments the controller cluster 102 includes more than two controllers as shown, for example, in FIG. 3. Thus, the procedures described with regard to FIGS. 13 and 16 need to be revised to accommodate the additional controllers. Referring briefly back to FIG. 3, the controller cluster 102 includes the primary controller 106, the secondary controller 108, a third controller 110, and an n-th controller

112. While four controllers are shown, the controller cluster 102 may include a different number of controllers in practical applications.

Figure 20:
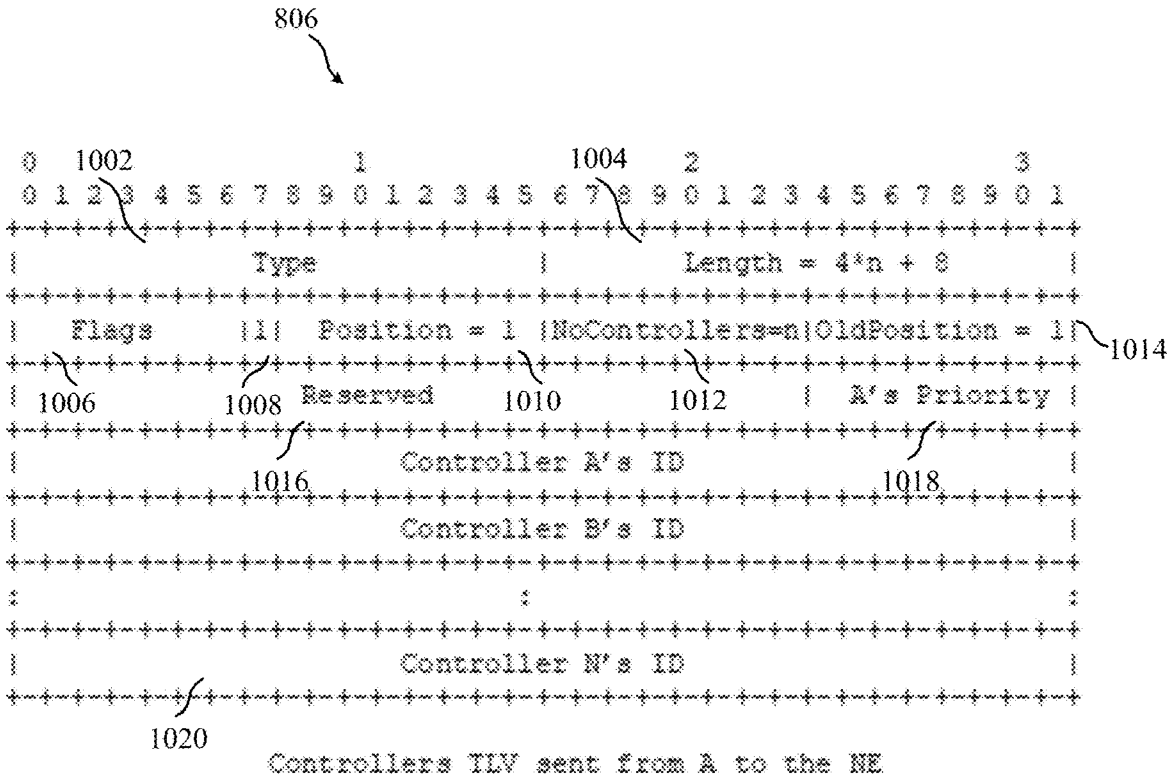
FIG. 20 is a schematic diagram of the controllers TLV structure transmitted from the primary controller to the network element using the control channel.

FIG. 20 is a schematic diagram of the controllers TLV structure 806 transmitted from the primary controller 106 to the network element 150 labeled PE2 using the control channel 152. In an embodiment, a separate control channel established between the primary controller 106 and the network element 150 labeled PE2 may be used to transmit the controllers TLV structure 806. The controllers TLV structure 806 may also be transmitted to the network element 150 labeled PE3 to provide redundancy. As shown in FIG. 20, the one flag bit 1008 and the value in the position field 1010 have both been set to 1 to indicate that the primary controller 106 is the active primary controller for the network 104. The number of controllers field 1012 is set to indicate the number of controllers in communication with the primary controller 106. As such, the number of controllers field 1012 is set to the value of n, which represents that there are n controllers in the controller cluster 102.

Because the primary controller 106 was previously the active primary controller, the old position field 1014 has been set to a value of 1. In addition, the priority field 1018 has been updated to include the primary controller's priority and the connected controller ID field 1020 has been populated with the ID of each of the controllers in the controller cluster 102 (e.g., primary controller 106, the secondary controller 108, the third controller 110, and the n-th controller 112).

Figure 21:
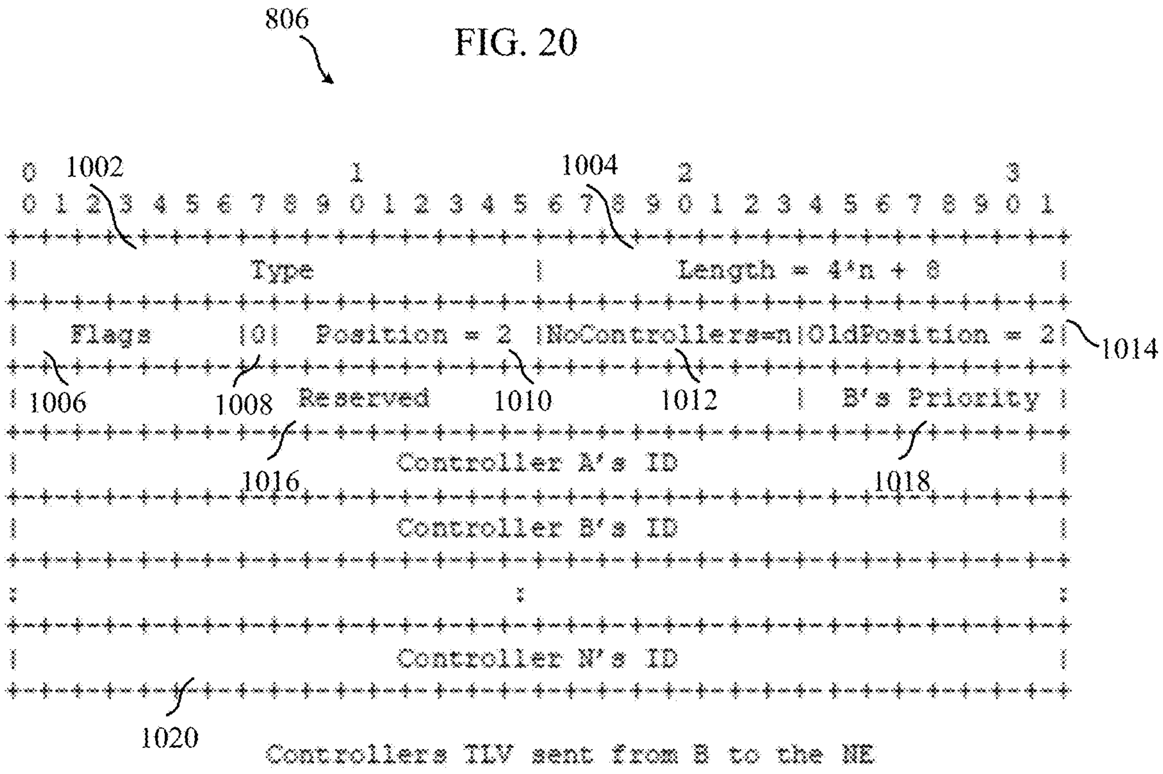
FIG. 21 is a schematic diagram of the controllers TLV structure transmitted from the secondary controller to the network element using the information channel.

FIG. 21 is a schematic diagram of the controllers TLV structure 806 transmitted from the secondary controller 108 to the network element 150 labeled PE2 using the information channel 162. The controllers TLV structure 806 may also be transmitted to the network element 150 labeled PE3 to provide redundancy. As shown in FIG. 21, the one flag bit 1008 has been set to a value of 0 to indicate that the secondary controller 108 is not the primary controller for the network 104. In addition, the position field 1010 has been set to a value of 2 to indicate that the secondary controller 108 has a second position (relative to the first position of the primary controller 106) and serves as a backup controller. The number of controllers field 1012 is set to indicate the number of controllers in communication with the primary controller 106. As such, the number of controllers field 1012 is set to the value of n, which represents that there are n controllers in the controller cluster 102.

Because the secondary controller 108 was previously a backup controller, the old position field 1014 has been set to a value of 2. In addition, the priority field 1018 has been updated to include the secondary controller's priority and the connected controller ID field 1020 has been populated with the ID of each of the controllers in the controller cluster 102 (e.g., primary controller 106, the secondary controller 108, the third controller 110, and the n-th controller 112).

It should be recognized that the third controller 110 and the n-th controller 112 also transmit a controllers TLV structure 806 to the network element 150 labeled PE2 using an information channel. For the third controller 110, the one flag bit 1008 has been set to a value of 0 to indicate that the third controller 110 is not the primary controller for the network 104. In addition, the position field 1010 has been set to a value of 3 to indicate that the third controller 110 has a third position (relative to the first position of the primary controller 106 and the second position of the secondary controller 108) and serves as another backup controller. The number of controllers field 1012 is set to indicate the number of controllers in communication with the primary controller 106. As such, the number of controllers field 1012 is set to the value of n, which represents that there are n controllers in the controller cluster 102.

Because the third controller 110 was previously a backup controller, the old position field 1014 has been set to a value of 3. In addition, the priority field 1018 has been updated to include the third controller's priority and the connected controller ID field 1020 has been populated with the ID of each of the controllers in the controller cluster 102 (e.g., primary controller 106, the secondary controller 108, the third controller 110, and the n-th controller 112).

For the n-th controller 112, the one flag bit 1008 has been set to a value of 0 to indicate that the n-th controller 110 is not the primary controller for the network 104. In addition, the position field 1010 has been set to a value of n to indicate that the n-th controller 112 has an n-th position (relative to the first position of the primary controller 106, the second position of the secondary controller 108, and the third position of the third controller 110) and serves as another backup controller. The number of controllers field 1012 is set to indicate the number of controllers in communication with the primary controller 106. As such, the number of controllers field 1012 is set to the value of n, which represents that there are n controllers in the controller cluster 102.

Because the n-th controller 112 was previously a backup controller, the old position field 1014 has been set to a value of n. In addition, the priority field 1018 has been updated to include the n-th controller's priority and the connected controller ID field 1020 has been populated with the ID of each of the controllers in the controller cluster 102 (e.g., primary controller 106, the secondary controller 108, the third controller 110, and the n-th controller 112).

Figure 22:
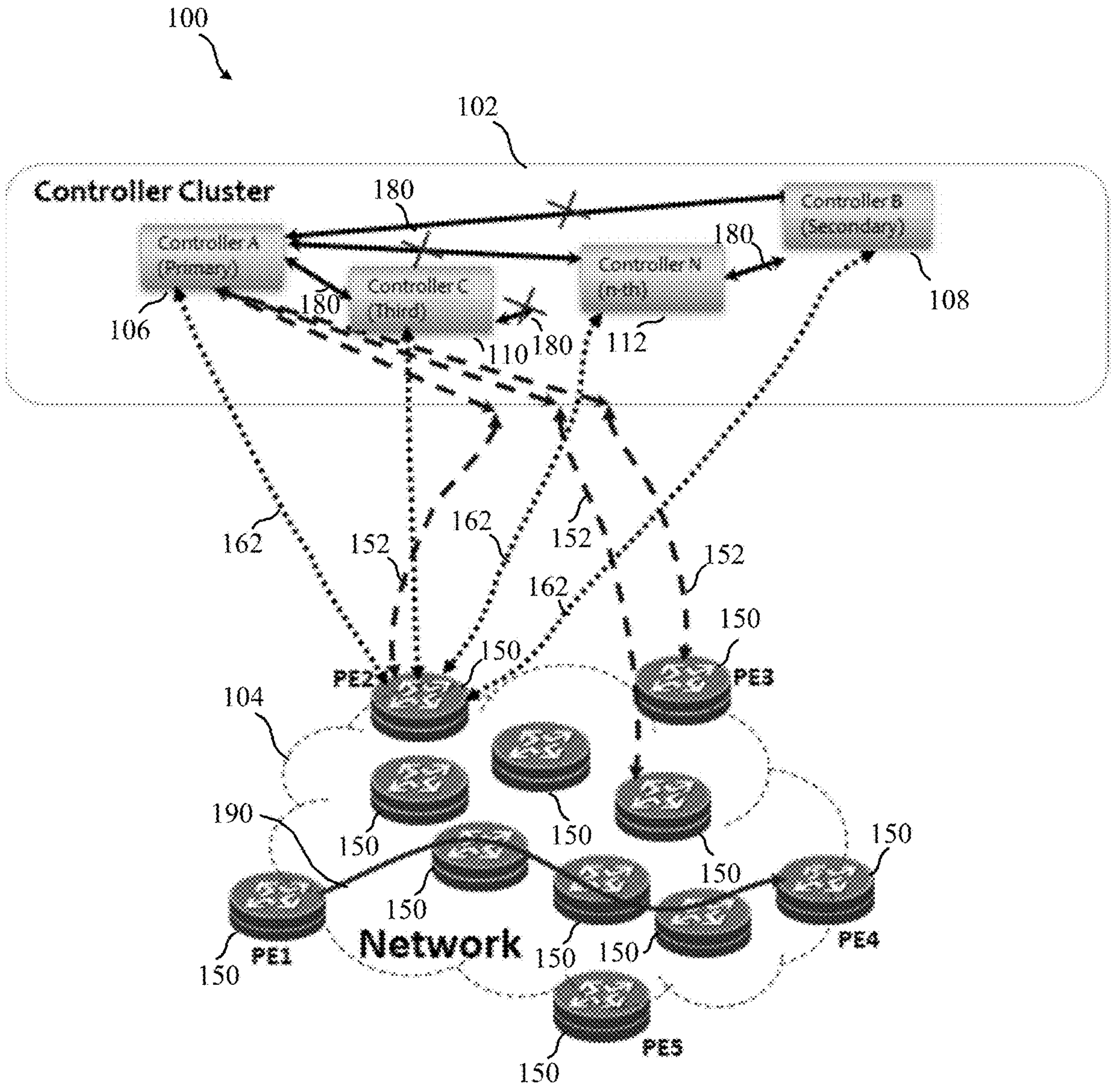
FIG. 22 is a schematic diagram of the network architecture depicting multiple failures in the controller cluster.

FIG. 22 is a schematic diagram of the network architecture 100 depicting multiple failures in the controller cluster 102. Because of the failed connections 180, the secondary controller 108 and the n-th controller 112 in the second group may no longer receive a heartbeat message (or other expected communications) from the primary controller 106 in the first group. Therefore, a separated group of controllers cannot determine whether their group has the largest number of controllers due to the failures. That is, each group of controllers has no way of determining how many controllers are in the other groups.

In an embodiment, each group elects a primary controller, a secondary controller, and so on for that group. For example, the first group in FIG. 22 would elect the primary controller 106 as the presumptive or intended primary controller for the first group because the primary controller 106 has a higher priority or a higher position relative to the third controller 110. Similarly, the second group in FIG. 22 would elect the secondary controller 108 as the presumptive or intended primary controller for the second group because the secondary controller 108 has a higher priority or a higher position relative to the n-th controller 112.

Figure 23:
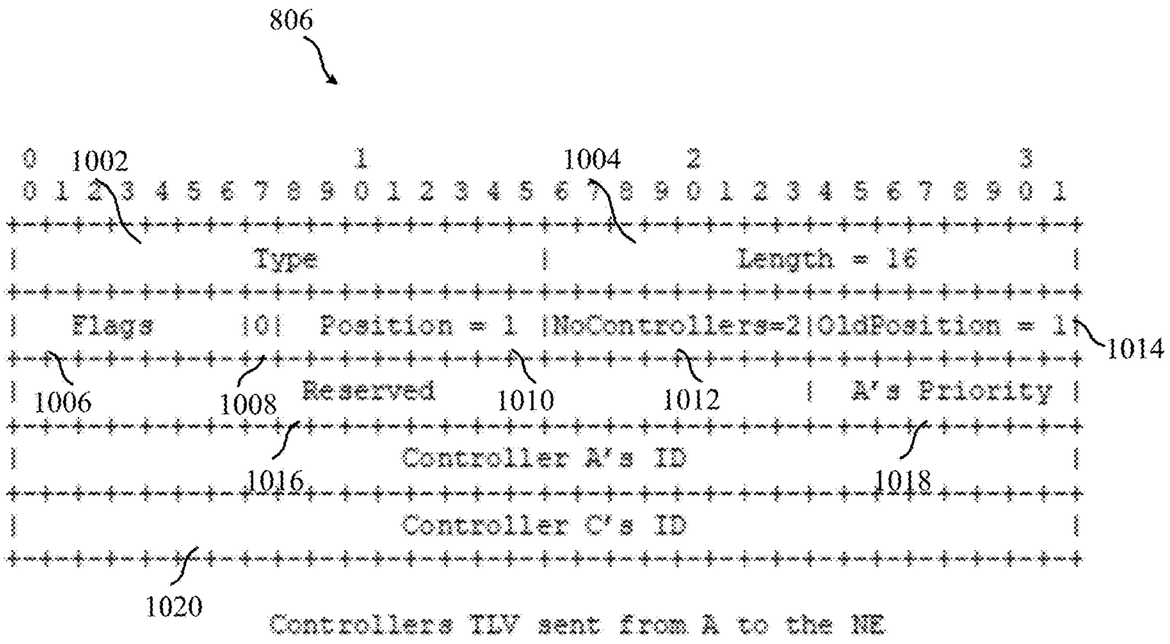
FIG. 23 is a schematic diagram of the controllers TLV structure transmitted from the primary controller to the network element using the control channel or the information channel extending between the primary controller and the network element following detection of the connection failures.

FIG. 23 is a schematic diagram of the controllers TLV structure 806 transmitted from the primary controller 106 to the network element 150 labeled PE2 using the control channel 152 or the information channel 162 extending between the primary controller 106 and the network element 150 labeled PE2 following detection of the connection failures 180.

As shown in FIG. 23, the one flag bit 1008 has been set to a value of 0 and the position field has been set to a value of 1 to indicate that the primary controller 106 is intending to promote itself to the new primary controller for the controller cluster 102. The number of controllers field 1012 is set to a value of 2 because there are two controllers (e.g., the primary controller 106 and the third controller 110) in the first group. The old position filed 1014 is set to 1 to indicate the prior position of the primary controller 106. In addition, the ID of the primary controller 106 and the third controller 110 are included in the connected controller ID field 1020.

Figure 24:
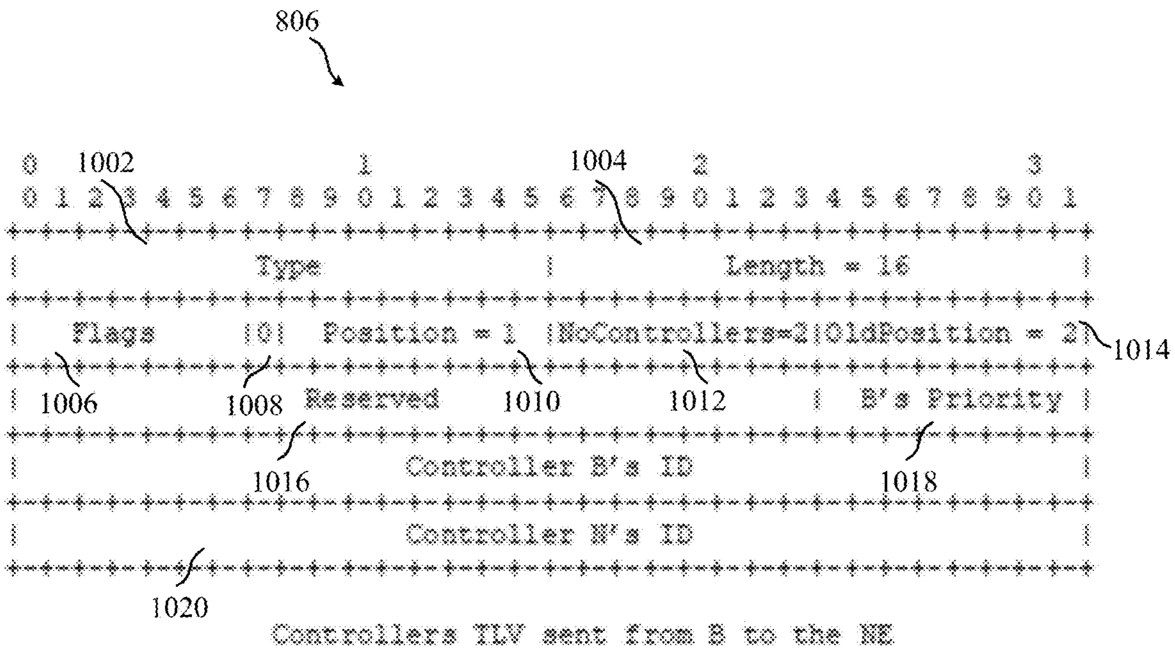
FIG. 24 is a schematic diagram of the controllers TLV structure transmitted from the secondary controller to the network element using the information channel extending between the secondary controller and the network element following detection of the connection failures.

FIG. 24 is a schematic diagram of the controllers TLV structure 806 transmitted from the secondary controller 108 to the network element 150 labeled PE2 using the information channel 162 extending between the secondary controller 108 and the network element 150 labeled PE2 following detection of the connection failures 180.

As shown in FIG. 24, the one flag bit 1008 has been set to a value of 0 and the position field has been set to a value of 1 to indicate that the secondary controller 108 is intending to promote itself to the new primary controller for the controller cluster 102. The number of controllers field 1012 is set to a value of 2 because there are two controllers (e.g., the secondary controller 108 and the n-th controller 112) in the second group. The old position filed 1014 is set to 2 to indicate the prior position of the secondary controller 108. In addition, the ID of the secondary controller 108 and the n-th controller 112 are included in the connected controller ID field 1020.

Once the network element 150 labeled PE2 receives the controllers TLV structure 806 from the primary controller 106, the network element 150 transmits the controllers TLV structure 806 to the secondary controller 108. Likewise, once the network element 150 labeled PE2 receives the controllers TLV structure 806 from the secondary controller 108, the network element 150 transmits the controllers TLV structure 806 to the primary controller 106.

The primary controller 106 and the secondary controller 108 each examine the controllers TLV structure 806 to determine whether the first group or the second group has the most controllers. To do so, the primary controller 106 and the secondary controller 108 evaluate the value in the number of controllers field 1012.

For example, if the value in the number of controllers field 1012 in the controllers TLV structure 806 sent by the primary controller 106 to the network element 150 is higher than the value in the number of controllers field 1012 in the controllers TLV structure 806 received by the primary controller 106 from the network element 150, then there are a higher number of controllers in the first group (relative to the second group). If the value in the number of controllers field 1012 in the controllers TLV structure 806 sent by the secondary controller 108 to the network element 150 is higher than the value in the number of controllers field 1012 in the controllers TLV structure 806 received by the secondary controller 108 from the network element 150, then there are a higher number of controllers in the second group (relative to the first group).

If the first group has the most controllers, the intended or presumptive primary controller for the first group (e.g., the primary controller 106) is elected as the primary controller for the controller cluster 102. On the other hand, if the second group has the most controllers, the intended or presumptive primary controller for the second group (e.g., the secondary controller 108) is elected as the primary controller for the controller cluster 102.

In the illustrated embodiment, the value in the number of controllers field 1012 in the controllers TLV structure 806 sent by the primary controller 106 to the network element 150 is the same as the value in the number of controllers field 1012 in the controllers TLV structure 806 received by the primary controller 106 from the network element 150. That is, both the first group and the second group of controllers each contain 2 controllers after the failures 180. In such an embodiment, the value in the old position field 1014 is used as a tie-breaker. For example, because the primary controller 106 has an old position of 1 and the secondary controller has an old position of 2, the primary controller 106 is elected the primary controller for the controller cluster 102.

Figure 25:
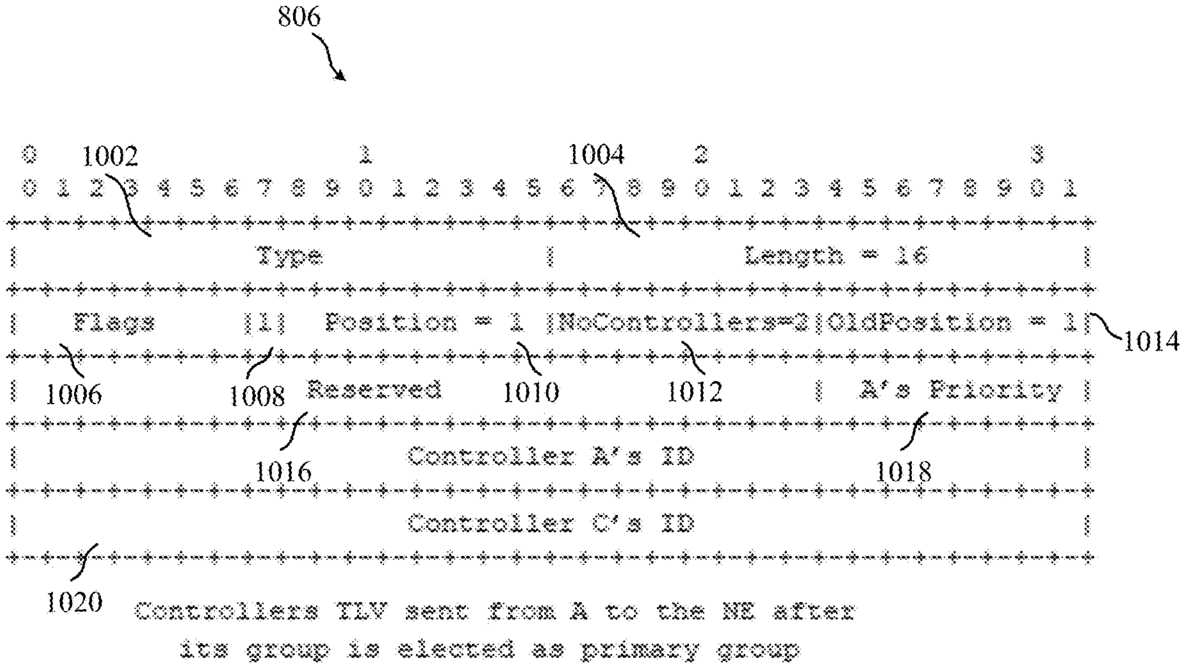
FIG. 25 is a schematic diagram of the controllers TLV structure transmitted from the primary controller to the network element using the control channel (or an information channel) extending between the primary controller and the network element following election of the primary controller as the primary controller for the controller cluster.

FIG. 25 is a schematic diagram of the controllers TLV structure 806 transmitted from the primary controller 106 to the network element 150 labeled PE2 using the control channel 152 (or an information channel) extending between the primary controller 106 and the network element 150 labeled PE2 following election of the primary controller 106 as the primary controller for the controller cluster 102.

As shown in FIG. 25, the one flag bit 1008 has been set to a value of 1 and the position field has been set to a value of 1 to indicate that the primary controller 106 is the primary controller for the controller cluster 102. The number of controllers field 1012 is set to a value of 2 because there are two controllers (e.g., the primary controller 106 and the third controller 110) in the first group. The old position filed 1014 is set to 1 to indicate the prior position of the primary controller 106. In addition, the ID of the primary controller 106 and the third controller 110 are included in the connected controller ID field 1020.

Figure 26:
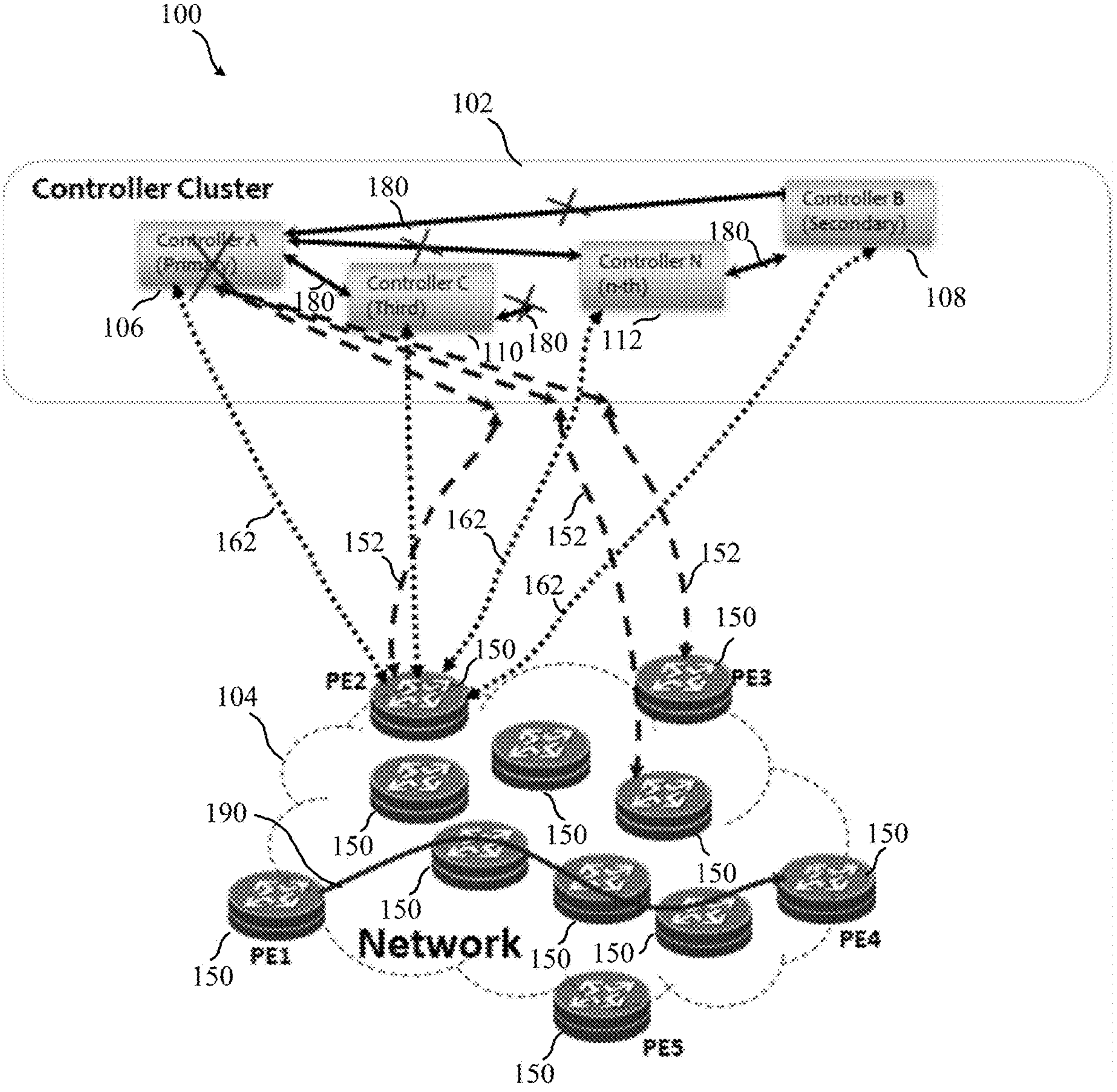
FIG. 26 is a schematic diagram of the network architecture depicting multiple failures in the controller cluster.

FIG. 26 is a schematic diagram of the network architecture 100 depicting multiple failures in the controller cluster 102. Because of the failures 180, the secondary controller 108 and the n-th controller 112 in the second group may no longer receive a heartbeat message (or other expected communications) from the primary controller 106 in the first group. Therefore, a separated group of controllers cannot determine whether their group has the largest number of controllers due to the failures. That is, each group of controllers has no way of determining how many controllers are in the other groups.

In an embodiment, each group elects a primary controller, a secondary controller, and so on for that group. For example, the first group in FIG. 26 would elect the third controller 110 as the presumptive or intended primary controller for the first group because the third controller 110 is the only functioning controller in the first group. Similarly, the second group in FIG. 26 would elect the secondary controller 108 as the presumptive or intended primary controller for the second group because the secondary controller 108 has a higher priority or a higher position relative to the n-th controller 112.

Figure 27:
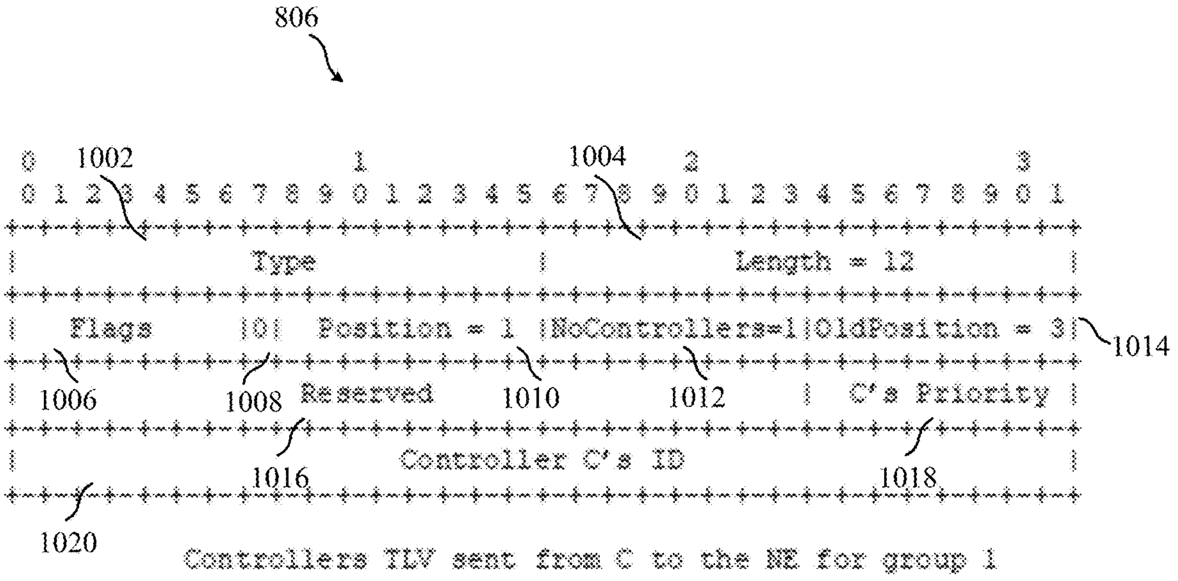
FIG. 27 is a schematic diagram of the controllers TLV structure transmitted from the third controller to the network element using the information channel extending between the third controller and the network element following detection of the failures.

FIG. 27 is a schematic diagram of the controllers TLV structure 806 transmitted from the third controller 110 to the network element 150 labeled PE2 using the information channel 162 extending between the third controller 110 and the network element 150 labeled PE2 following detection of the failures 180.

As shown in FIG. 27, the one flag bit 1008 has been set to a value of 0 and the position field has been set to a value of 1 to indicate that the third controller 110 is intending to promote itself to the new primary controller for the controller cluster 102. The number of controllers field 1012 is set to a value of 1 because there is only one controller functioning (e.g., the third controller 110) in the first group. The old position filed 1014 is set to 3 to indicate the prior position of the third controller 108 before the failures 180. In addition, the ID of the third controller 110 is included in the connected controller ID field 1020.

Figure 28:
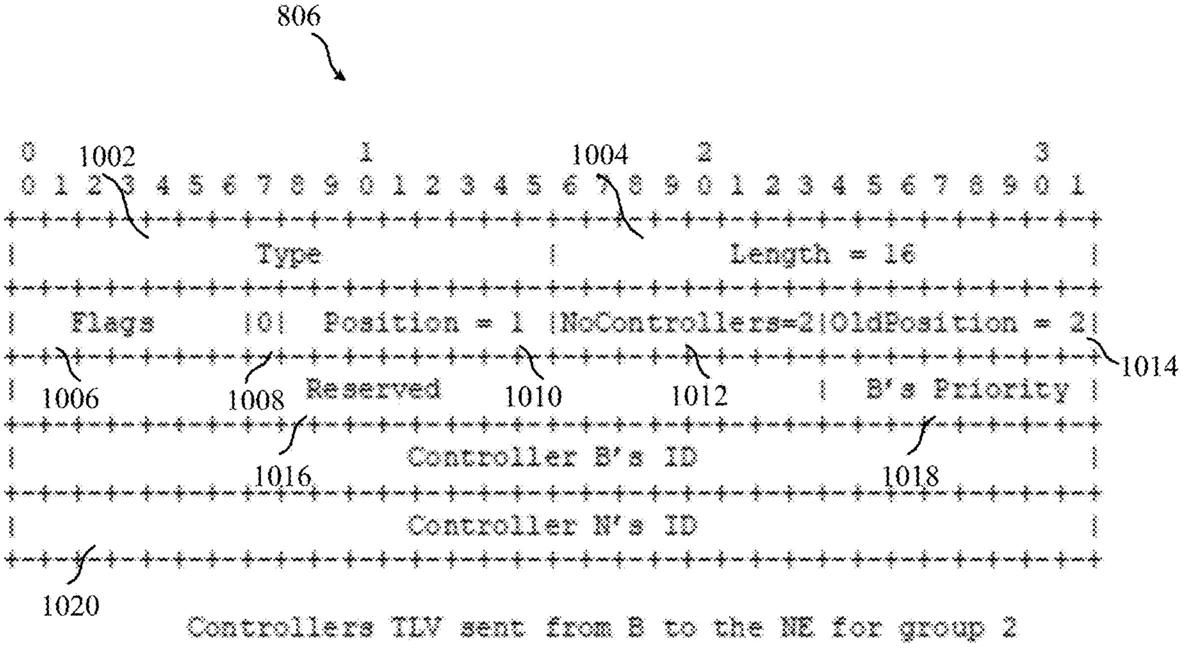
FIG. 28 is a schematic diagram of the controllers TLV structure transmitted from the secondary controller to the network element using the information channel extending between the secondary controller and the network element following detection of the connection failures.

FIG. 28 is a schematic diagram of the controllers TLV structure 806 transmitted from the secondary controller 108 to the network element 150 labeled PE2 using the information channel 162 extending between the secondary controller 108 and the network element 150 labeled PE2 following detection of the connection failures 180.

As shown in FIG. 28, the one flag bit 1008 has been set to a value of 0 and the position field has been set to a value of 1 to indicate that the secondary controller 108 is intending to promote itself to the new primary controller for the controller cluster 102. The number of controllers field 1012 is set to a value of 2 because there are two controllers (e.g., the secondary controller 108 and the n-th controller 112) in the second group. The old position filed 1014 is set to 2 to indicate the prior position of the secondary controller 108 before the failures 180. In addition, the ID of the secondary controller 108 and the n-th controller 112 are included in the connected controller ID field 1020.

Once the network element 150 labeled PE2 receives the controllers TLV structure 806 from the third controller 110, the network element 150 transmits the controllers TLV structure 806 to the secondary controller 108. Likewise, once the network element 150 labeled PE2 receives the controllers TLV structure 806 from the secondary controller 108, the network element 150 transmits the controllers TLV structure 806 to the third controller 110.

The third controller 110 and the secondary controller 108 each examine the controllers TLV structure 806 to determine whether the first group or the second group has the most controllers. To do so, the third controller 110 and the secondary controller 108 evaluate the value in the number of controllers field 1012.

In the illustrated embodiment, the value in the number of controllers field 1012 in the controllers TLV structure 806 sent by the secondary controller 108 to the network element 150 is higher than the value in the number of controllers field 1012 in the controllers TLV structure 806 received by the secondary controller 108 from the network element 150, then there are a higher number of controllers in the second group (relative to the first group). Because the second group has the most controllers, the intended or presumptive primary controller for the second group (e.g., the secondary controller 108) is elected as the primary controller for the controller cluster 102.

Figure 29:
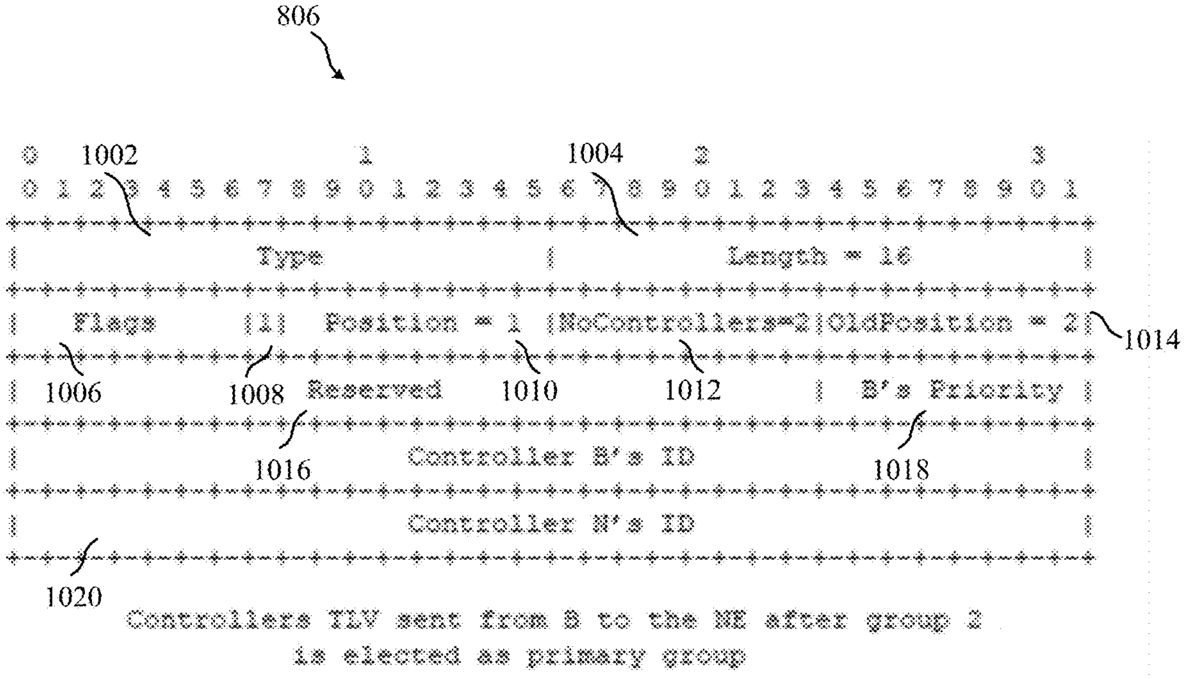
FIG. 29 is a schematic diagram of the controllers TLV structure transmitted from the secondary controller to the network element using the information channel (or a control channel) extending between the secondary controller and the network element following election of the secondary controller as the primary controller for the controller cluster.

FIG. 29 is a schematic diagram of the controllers TLV structure 806 transmitted from the secondary controller 108 to the network element 150 labeled PE2 using the information channel 162 (or a control channel) extending between the secondary controller 108 and the network element 150 labeled PE2 following election of the secondary controller 108 as the primary controller for the controller cluster 102.

As shown in FIG. 29, the one flag bit 1008 has been set to a value of 1 and the position field has been set to a value of 1 to indicate that the secondary controller 108 is the primary controller for the controller cluster 102. The number of controllers field 1012 is set to a value of 2 because there are two controllers (e.g., the secondary controller 108 and the n-th controller 112) in the second group. The old position filed 1014 is set to 2 to indicate the prior position of the secondary controller 108 before the failures 180. In addition, the ID of the secondary controller 108 and the n-th controller 112 are included in the connected controller ID field 1020.

Figure 30:
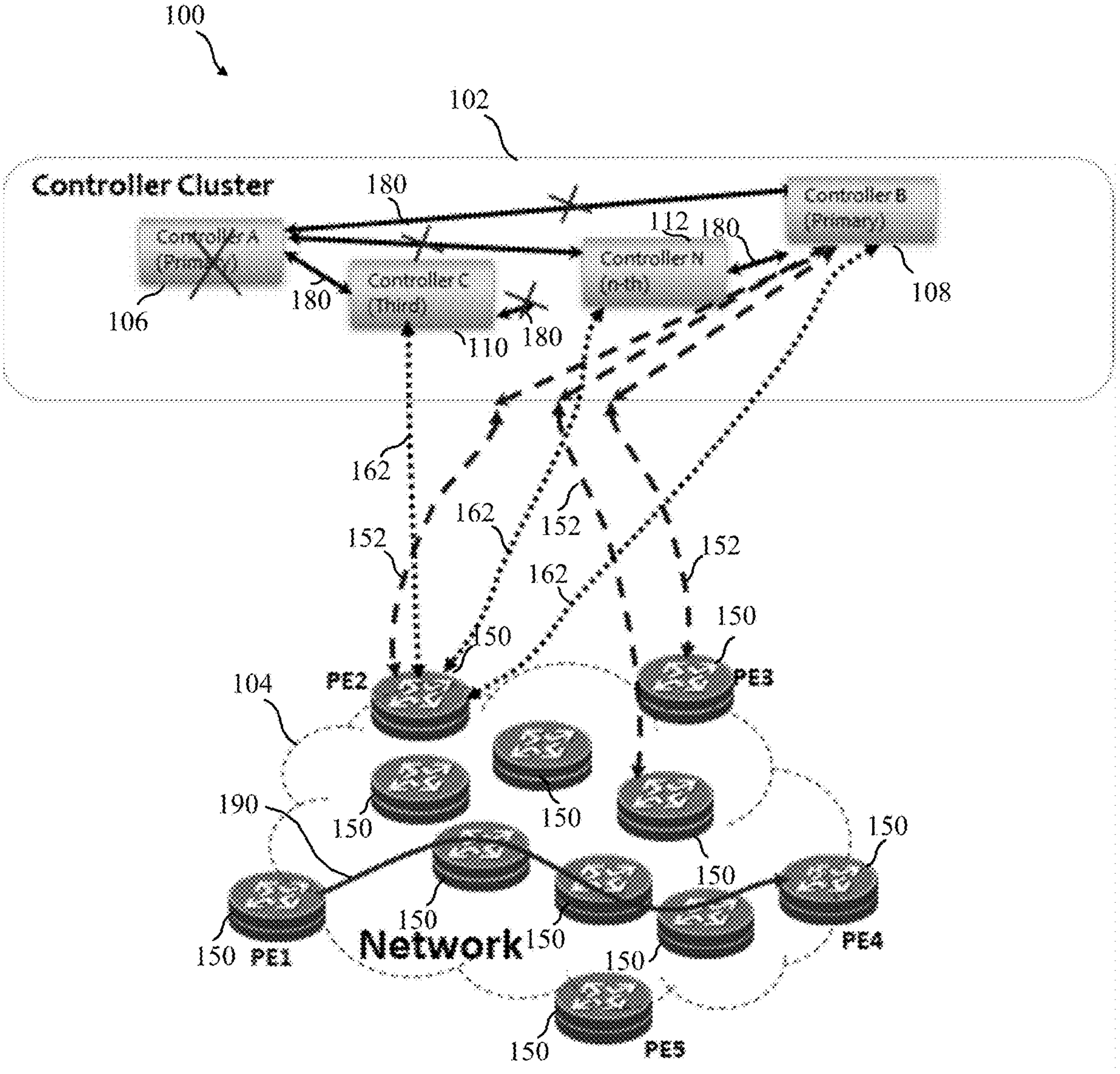
FIG. 30 is a schematic diagram of network architecture depicting a transition of the primary controller duties from the failed primary controller to the secondary controller.

FIG. 30 is a schematic diagram of network architecture 100 depicting a transition of the primary controller duties from the failed primary controller 106 to the secondary controller 108. Once the secondary controller 108 has transmitted the controllers TLV structure 806 depicted in FIG. 29 and/or promoted itself to the new active primary controller, the network elements 150 begin being managed by the secondary controller 108 through the control channels 152. Because the secondary controller 108 correctly promoted itself in this scenario, the situation where two controllers are trying to simultaneously manage the network 104 is avoided.

Figure 31:
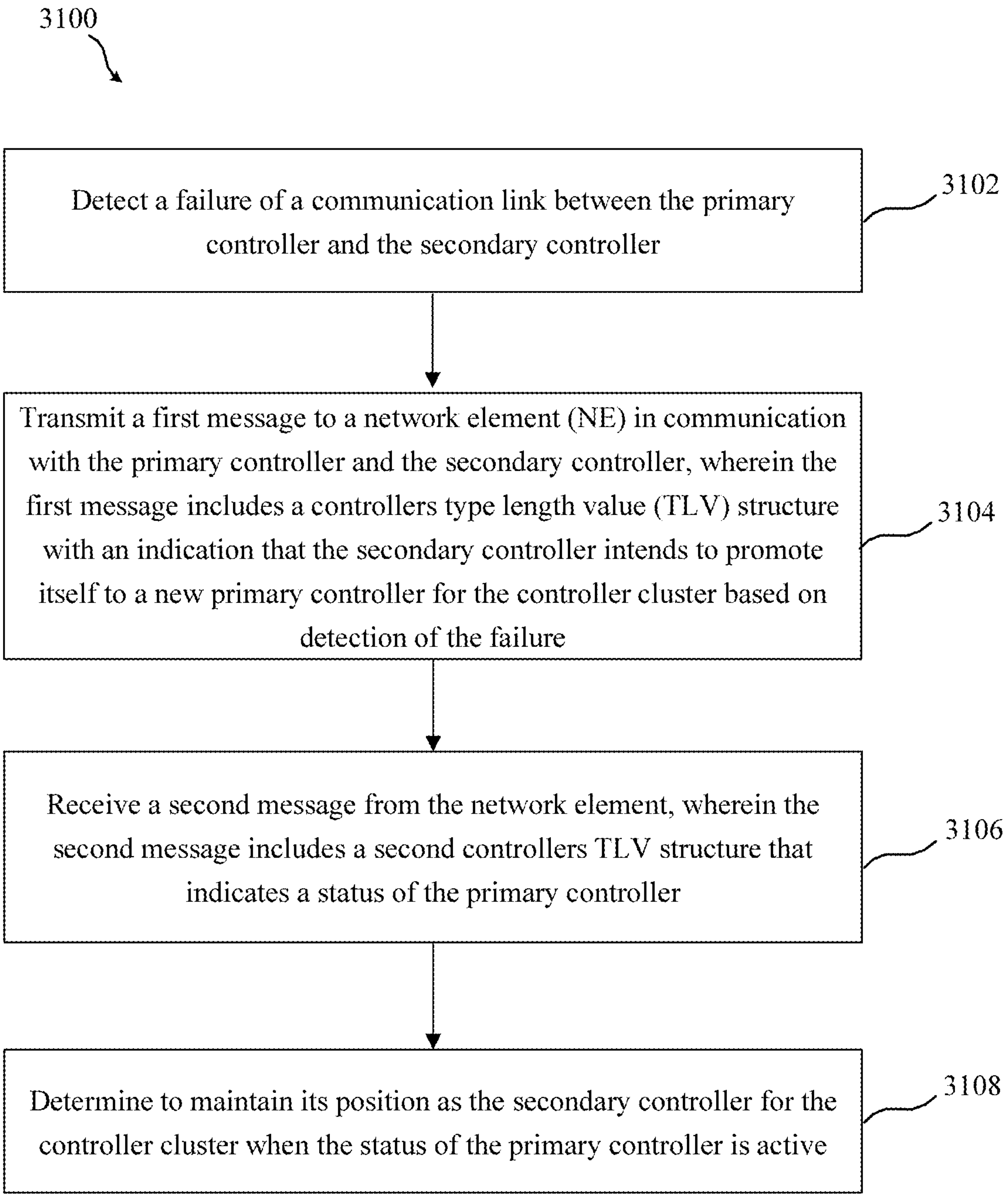
FIG. 31 is an embodiment of a method of network management implemented by a controller in a controller cluster.

FIG. 31 is an embodiment of a method 3100 of network management implemented by a controller (e.g., the secondary controller 108) in a controller cluster (e.g., the controller cluster 102). The method 3100 may be performed to ensure separated controllers are able to correctly determine whether a new primary controller should be promoted when a link between the controllers has failed. Therefore, the situation where two or more controllers are attempting to simultaneously control or manage a network (e.g., network 104) may be avoided. As a practical matter, the improved network management techniques disclosed herein offer more reliable, stable, and error-free network management.

In block 3102, the secondary controller detects a failure of a communication link (e.g., connection 180) between the primary controller (e.g., primary controller 106) and the secondary controller (e.g., secondary controller 108). Because of the failure, the primary controller and the secondary controller are no longer in direct communication with each other.

In block 3104, the secondary controller transmits a first message to a network element (e.g., the network element 150 labeled PE2) in communication with the primary controller and the secondary controller. The first message includes a controllers type length value (TLV) structure (e.g., TLV 806) with an indication that the secondary controller is attempting to (i.e., intends to) promote itself to a new primary controller for the controller cluster based on detection of the failure. In an embodiment, the indication in the controllers TLV structure that the secondary controller is attempting to promote itself comprises a C-bit set to a first value and a position field set to a second value. In an embodiment, the first value is zero and the second value is one.

In an embodiment, the controllers TLV structure further identifies a number of controllers advertising the controllers TLV structure, an old position of the secondary controller, a priority of the secondary controller, and an identifier (ID) of the secondary controller.

In an embodiment, one or more of the primary controller and the secondary controller is a path computational element (PCE). In an embodiment, the network element is a path computational client (PCC).

In block 3106, the secondary controller receives a second message from the network element. The second message includes a second controllers TLV structure that indicates a status of the primary controller. In an embodiment, one or more of the first message and the second message are exchanged over an information channel (e.g., the information channel 162). In an embodiment, the first message is exchanged over a control channel (e.g., the control channel 152).

In block 3108, the secondary controller determines to maintain its position as the secondary controller for the controller cluster when the status of the primary controller is active (a.k.a., alive, functioning, managing the network, etc.).

In an embodiment, the secondary controller transmits a capability message to the network element to indicate a capability for high availability of controllers (HAC) as described herein. In an embodiment, the capability message comprises an open message including an open object, wherein the open object includes a controller capability TLV structure, wherein the controller capability TLV structure includes a second C-bit, wherein the second C-bit is set to a first value to indicate the secondary controller is a controller. In an embodiment, the capability message is sent to the network element prior to detection of the failure in the communication link.

Figure 32:
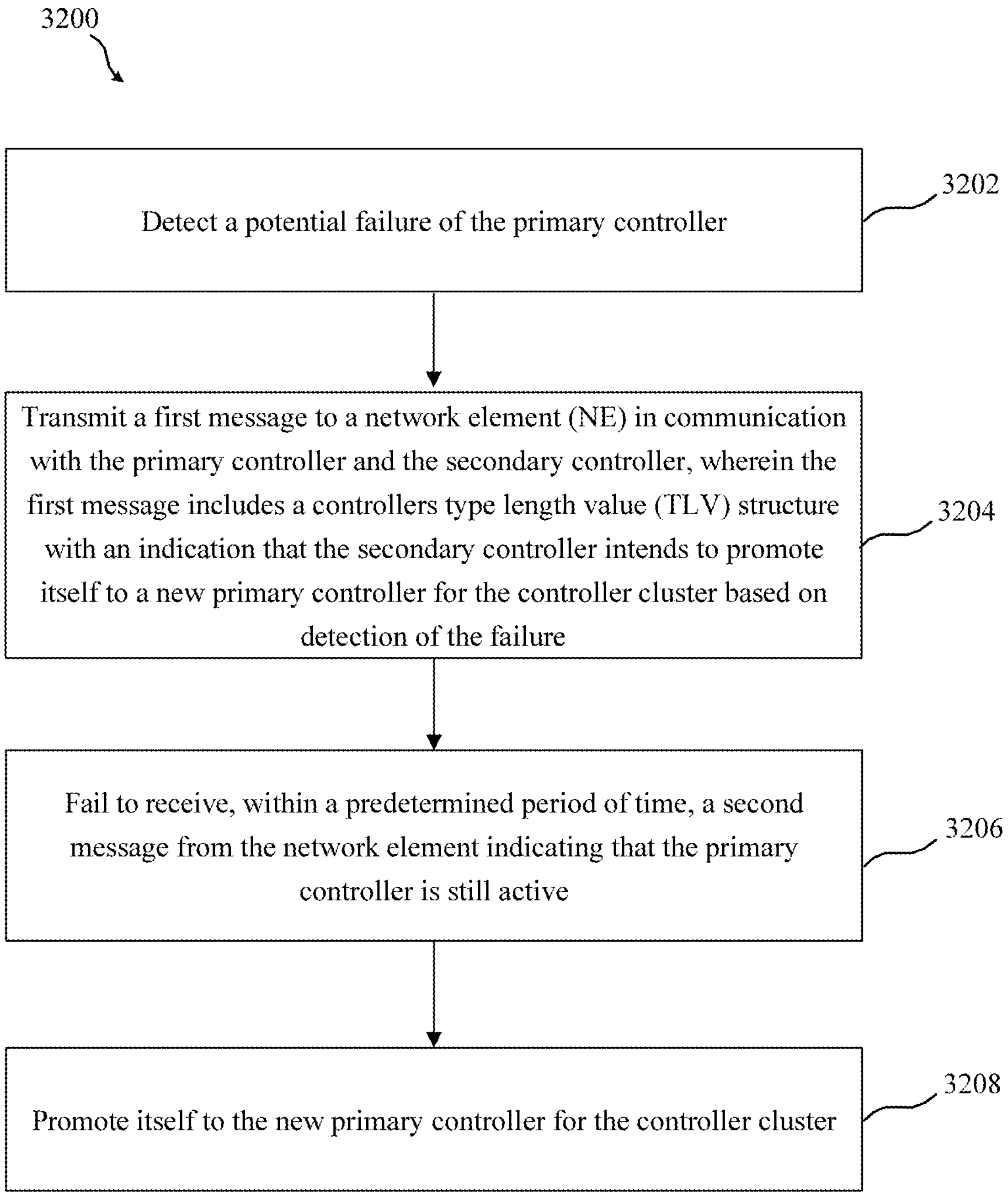
FIG. 32 is an embodiment of a method of network management implemented by a controller in a controller cluster.

FIG. 32 is an embodiment of a method 3200 of network management implemented by a controller (e.g., the secondary controller 108) in a controller cluster (e.g., the controller cluster 102). The method 3200 may be performed to ensure separated controllers are able to correctly determine whether a new primary controller should be promoted when the current primary controller (e.g., the primary controller 106) has potentially failed. Therefore, the situation where two or more controllers are attempting to simultaneously control or manage a network (e.g., network 104) may be avoided. As a practical matter, the improved network management techniques disclosed herein offer more reliable, stable, and error-free network management.

In block 3202, the secondary controller detects a potential failure of the primary controller. Detection of the potential failure may occur because, for example, the secondary controller stops receiving a heartbeat message or other expected communications from the primary controller over the connection 180.

In block 3204, the secondary controller transmits a first message to a network element (NE) in communication with the primary controller and the secondary controller. The first message includes a controllers type length value (TLV) structure (e.g., the controllers TLV structure 806) with an indication that the secondary controller is attempting to promote itself to a new primary controller for the controller cluster based on detection of the potential failure. In an embodiment, the indication in the controllers TLV structure that the secondary controller is attempting to promote itself comprises a C-bit set to a first value and a position field set to a second value. In an embodiment, the first value is zero and the second value is one.

In block 3206, the secondary controller fails to receive, within a predetermined period of time, a second message from the network element indicating that the primary controller is still active.

In block 3208, the secondary controller promotes itself to the new primary controller for the controller cluster. In an embodiment, the secondary controller removes an information channel (e.g., information channel 162) between the secondary controller and the network element and establishes a control channel (e.g., control channel 152) between the secondary controller and the network element after the secondary controller has promoted itself to the new primary controller for the controller cluster.

In an embodiment, the secondary controller transmits a third message to the network element. The third message includes an updated controllers TLV structure. The updated controllers TLV structure comprises a C-bit set to a first value and a position filed set to a second value to indicate that the secondary controller is the new primary controller. In an embodiment, the first value is zero and the second value is one. In an embodiment, the first message is transmitted over an information channel, and wherein the third message is transmitted over the information channel or a control channel. In an embodiment, one or more of the primary controller and the secondary controller is a path computational element (PCE), and wherein the network element is a path computational client (PCC).

Figure 33:
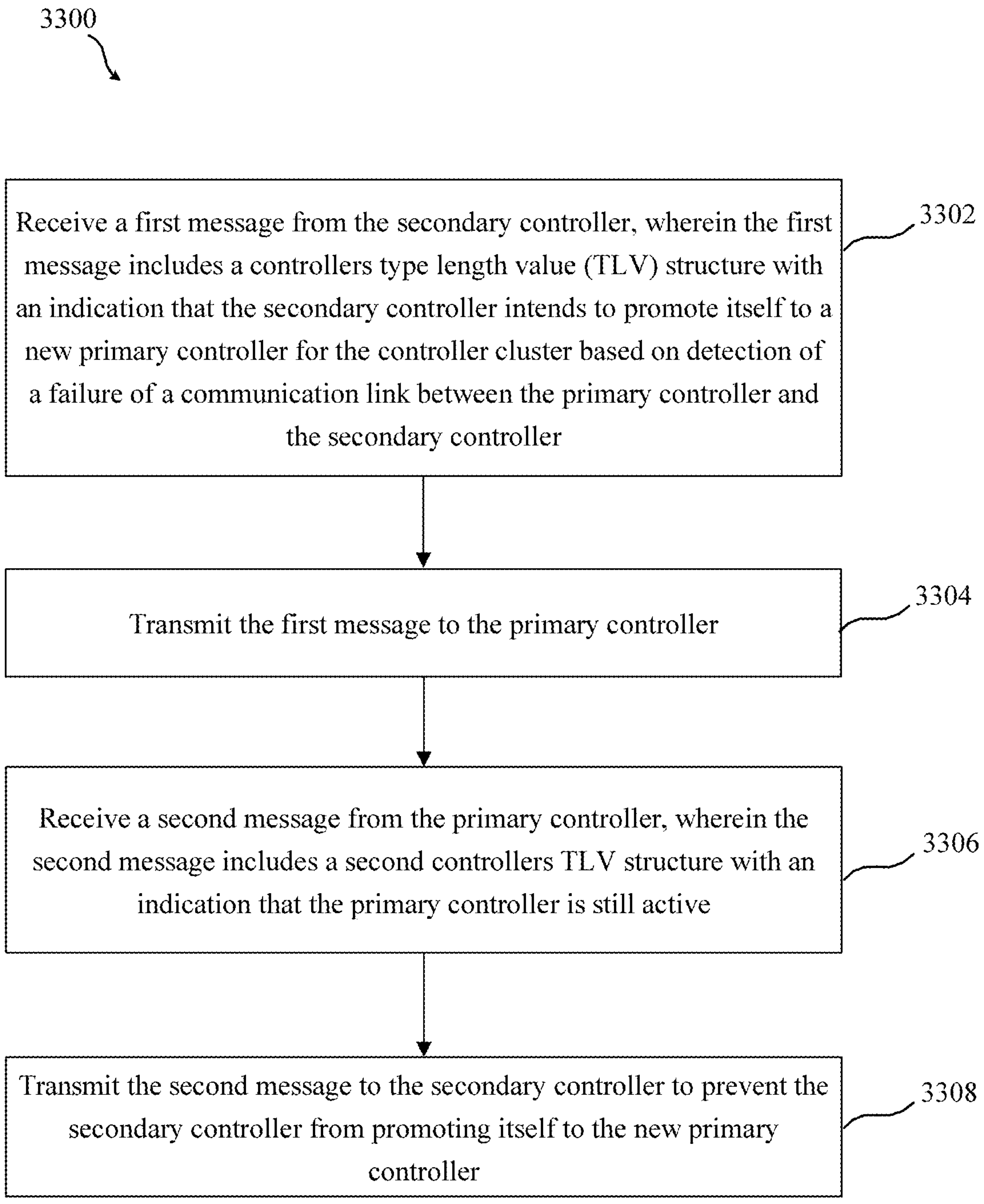
FIG. 33 is an embodiment of a method implemented by a network element.

FIG. 33 is an embodiment of a method 3300 implemented by a network element (e.g., the network element 150 labeled PE2). The method 3300 may be performed to ensure separated controllers are able to correctly determine whether a new primary controller should be promoted when a communication link between the current primary controller (e.g., the primary controller 106) and the secondary controller has failed. Therefore, the situation where two or more controllers are attempting to simultaneously control or manage a network (e.g., network 104) may be avoided. As a practical matter, the improved network management techniques disclosed herein offer more reliable, stable, and error-free network management.

In block 3302, the network element receives a first message from the secondary controller. The first message includes a controllers type length value structure (e.g., the TLV structure 806) with an indication that the secondary controller is attempting to promote itself to a new primary controller for the controller cluster based on detection of a failure of a communication link between the primary controller and the secondary controller. In an embodiment, the indication in the controllers TLV structure that the secondary controller is attempting to promote itself comprises a C-bit set to a first value and a position field set to a second value. In an embodiment, the first value is zero and the second value is one. In an embodiment, the first message is received through an information channel (e.g., information channel 162).

In block 3304, the network element transmits the first message to the primary controller. In an embodiment, the first message is transmitted to the primary controller through an information channel or through a control channel (e.g., control channel 152).

In block 3306, the network element receives a second message from the primary controller. The second message includes a second controllers type length value structure with an indication that the primary controller is still active. In an embodiment, the indication in the second controllers TLV structure that the primary controller is still active comprises a second C-bit set to a third value and a second position field set to a forth value. In an embodiment, the third value is one and the forth value is one.

In block 3308, the network element transmits the second message to the secondary controller to prevent the secondary controller from promoting itself to the new primary controller.

Figure 34:
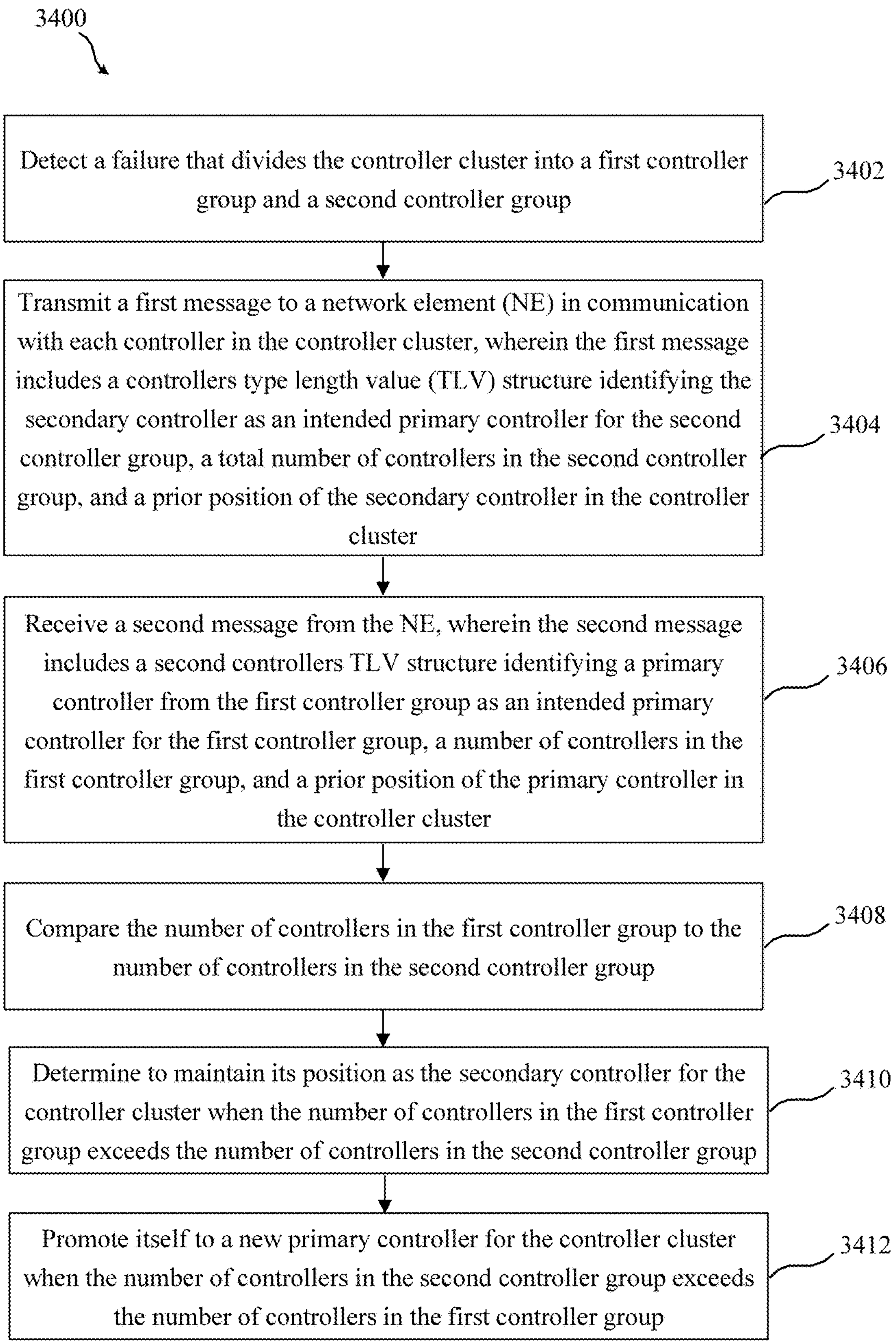
FIG. 34 is an embodiment of a method of network management implemented by a controller in a controller cluster.

FIG. 34 is an embodiment of a method 3400 of network management implemented by a controller (e.g., the secondary controller 108) in a controller cluster (e.g., the controller cluster 102). The method 3400 may be performed to ensure separated controller groups are able to correctly determine whether a new primary controller should be promoted when the controller groups have been separated from each other due to a failure. Therefore, the situation where two or more controllers are attempting to simultaneously control or manage a network (e.g., network 104) may be avoided. As a practical matter, the improved network management techniques disclosed herein offer more reliable, stable, and error-free network management.

In block 3402, the secondary controller detects a failure that divides the controller cluster into a first controller group and a second controller group. That is, some of the controllers in the controller cluster are separated from (e.g., unable to directly communicate with) other controllers in the controller cluster, which effectively creates two distinct groups of controllers within the controller cluster (see, for example, FIG. 22). The second controller group includes the secondary controller.

In block 3404, the secondary controller transmits a first message to a network element (NE) in communication with each controller in the controller cluster. The first message includes a controllers type length value structure (e.g., the TLV structure 806) identifying the secondary controller as an intended primary controller for the second controller group, a total number of controllers in the second controller group, and a prior position of the secondary controller in the controller cluster.

In block 3406, the secondary controller receives a second message from the NE. The second message includes a second controllers TLV structure identifying a primary controller from the first controller group as an intended primary controller for the first controller group, a number of controllers in the first controller group, and a prior position of the primary controller in the controller cluster.

In an embodiment, the controllers TLV in the first message and the controllers TLV in the second message each comprise a C-bit set to a first value. In an embodiment, the first value is zero.

In block 3408, the secondary controller compares the number of controllers in the first controller group to the number of controllers in the second controller group.

In block 3410, the secondary controller determines to maintain its position as the secondary controller for the controller cluster when the number of controllers in the first controller group exceeds the number of controllers in the second controller group. In an embodiment, the secondary controller receives a third message from the NE when the secondary controller has determined to maintain its position as the secondary controller. The third message includes a third controllers TLV structure identifying a primary controller from the first controller group as the new primary controller.

In block 3412, the secondary controller promotes itself to a new primary controller for the controller cluster when the number of controllers in the second controller group exceeds the number of controllers in the first controller group.

In an embodiment, the secondary controller compares the prior position of the primary controller in the controller cluster with the prior position of the secondary controller in the controller cluster when the number of controllers in the second controller group is equal to the number of controllers in the first controller group. Thereafter, the secondary controller promotes itself to a new primary controller for the controller cluster when the prior position of the secondary controller in the controller cluster is lower than the prior position of the primary controller in the controller cluster. The secondary controller determines to maintain its position as the secondary controller for the controller cluster when the prior position of the secondary controller in the controller cluster is higher than the prior position of the primary controller in the controller cluster.

In an embodiment, the secondary controller receives a third message from the NE. The third message includes a third controllers TLV structure identifying a primary controller from the first controller group as the new primary controller.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

Figure 35:
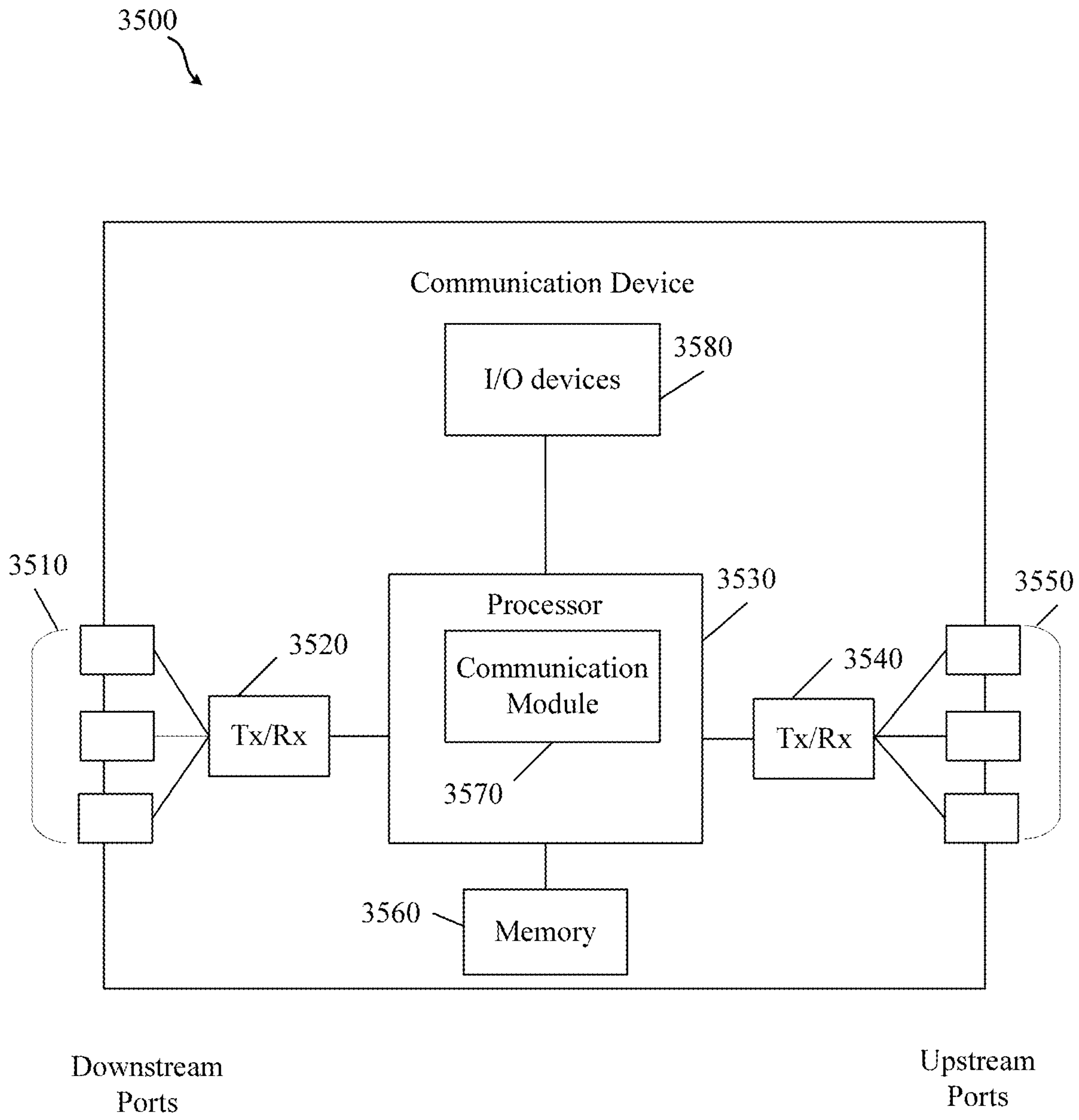
FIG. 35 is a schematic diagram of a communication device according to an embodiment of the disclosure.

FIG. 35 is a schematic diagram of a communication device 3500 (e.g., a primary controller 106, a secondary controller 108, a network element 150, etc.) according to an embodiment of the disclosure. The communication device 3500 is suitable for implementing the disclosed embodiments as described herein. The communication device 3500 comprises ingress ports 3510 and receiver units (Rx) 3520 for receiving data; a processor, logic unit, or central processing unit (CPU) 3530 to process the data; transmitter units (Tx) 3540 and egress ports 3550 for transmitting the data; and a memory 3560 for storing the data. The communication device 3500 may also comprise optical-to-electrical (OE) components and electrical-to-optical (EO) components coupled to the ingress ports 3510, the receiver units 3520, the transmitter units 3540, and the egress ports 3550 for egress or ingress of optical or electrical signals.

The processor 3530 is implemented by hardware and software. The processor 3530 may be implemented as one or more CPU chips, cores (e.g., as a multi-core processor), field-programmable gate arrays (FPGAs), application specific integrated circuits (ASICs), and digital signal processors (DSPs). The processor 3530 is in communication with the ingress ports 3510, receiver units 3520, transmitter units 3540, egress ports 3550, and memory 3560. The processor 3530 comprises a communication module 3570. The communication module 3570 implements the disclosed embodiments described above. For instance, the communication module 3570 implements, processes, prepares, or provides the various functions disclosed herein. The inclusion of the communication module 3570 therefore provides a substantial improvement to the functionality of the communication device 3500 and effects a transformation of the communication device 3500 to a different state. Alternatively, the communication module 3570 is implemented as instructions stored in the memory 3560 and executed by the processor 3530.

The communication device 3500 may also include input and/or output (I/O) devices 3580 for communicating data to and from a user. The I/O devices 3580 may include output devices such as a display for displaying video data, speakers for outputting audio data, etc. The I/O devices 3580 may also include input devices, such as a keyboard, mouse, trackball, etc., and/or corresponding interfaces for interacting with such output devices.

The memory 3560 comprises one or more disks, tape drives, and solid-state drives and may be used as an overflow data storage device, to store programs when such programs are selected for execution, and to store instructions and data that are read during program execution. The memory 3560 may be volatile and/or non-volatile and may be read-only memory (ROM), random access memory (RAM), ternary content-addressable memory (TCAM), and/or static random-access memory (SRAM).

Figure 36:
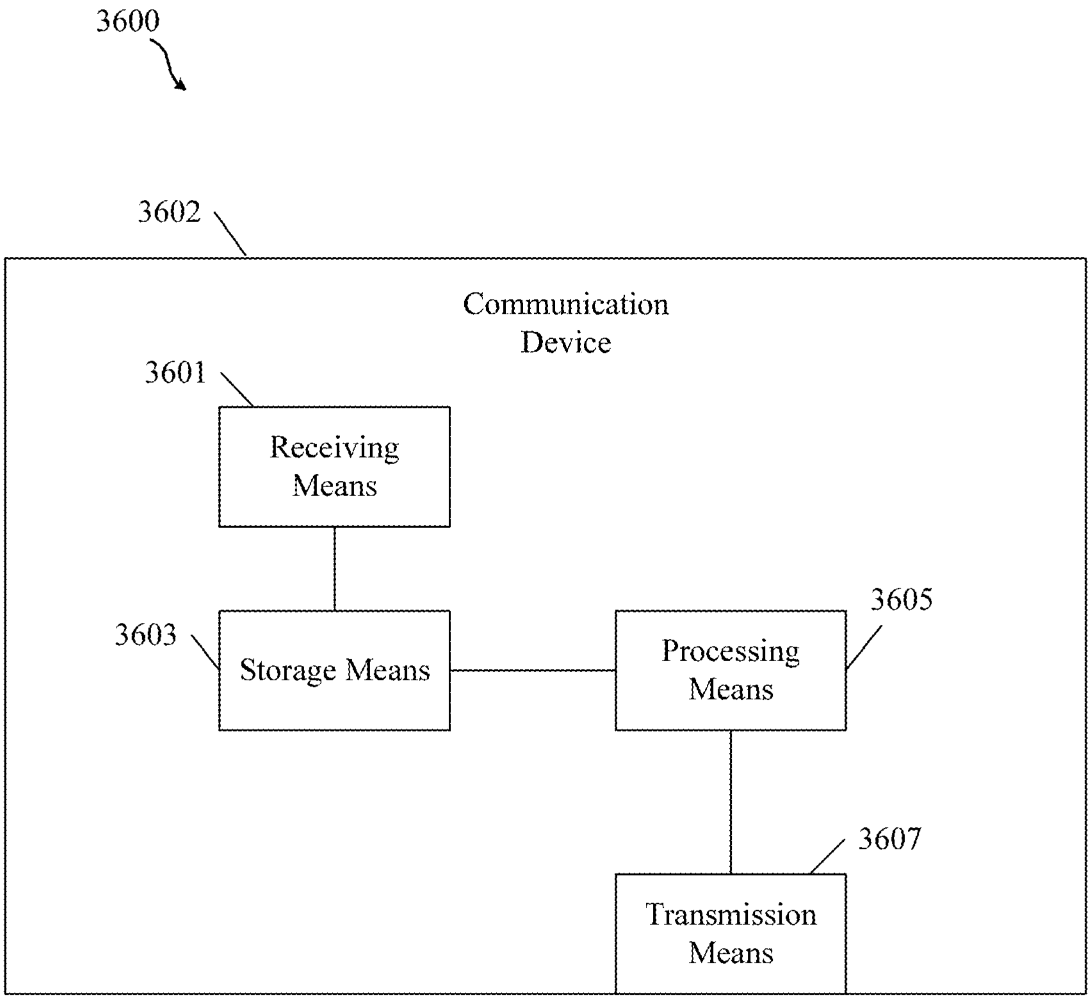
FIG. 36 is a schematic diagram of an embodiment of a means for network communication.

FIG. 36 is a schematic diagram of an embodiment of a means for network communication 3600. In an embodiment, the means for network communication 3600 is implemented in a communication device 3602 (e.g., a primary controller 106, a secondary controller 108, a network element 150, etc.). The communication device 3602 includes receiving means 3601. The receiving means 3601 is configured to receive, for example, one or more messages. The communication device 3602 includes transmission means 3607 coupled to the receiving means 3601. The transmission means 3607 is configured to transmit, for example, one or more messages. The receiving means 3601 and/or the transmission means 3607 may also receive from, send to, or exchange information (e.g., input from a network administrator or user) with one of the I/O devices 3580.

The communication device 3602 includes a storage means 3603. The storage means 3603 is coupled to at least one of the receiving means 3601 or the transmission means 3607. The storage means 3603 is configured to store instructions. The video coding device 3602 also includes processing means 3605. The processing means 3605 is coupled to the storage means 3603. The processing means 3605 is configured to execute the instructions stored in the storage means 3603 to perform the methods disclosed herein.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by a secondary controller in a controller cluster including a primary controller and the secondary controller, comprising:

detecting a failure of a communication link between the primary controller and the secondary controller;

transmitting a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the failure, wherein the controllers TLV structure further identifies a number of controllers including the secondary controller and one or more controllers connected to the secondary controller, an old position of the secondary controller comprising a prior relative position of the secondary controller within the controller cluster before the controller cluster or controller group is split, a priority of the secondary controller, and an identifier (ID) of the secondary controller;

receiving a second message from the network element, wherein the second message includes a second controllers TLV structure that indicates a status of the primary controller; and determining to maintain its position as the secondary controller for the controller cluster when the status of the primary controller is active.

2. The method of claim 1, wherein the indication in the controllers TLV structure that the secondary controller is attempting to promote itself comprises a C-bit set to a first value and a position field set to a second value.

3. The method of claim 2, wherein the first value is zero and the second value is one.

4. The method of claim 1, wherein one or more of the first message and the second message are exchanged over an information channel.

5. The method of claim 1, wherein one or more of the primary controller and the secondary controller is a path computational element (PCE), and wherein the network element is a path computational client (PCC).

6. The method of claim 1, further comprising transmitting an open message to the network element to indicate a capability for high availability of controllers (HAC).

7. The method of claim 6, wherein the open message includes an open object, wherein the open object includes a controller capability TLV structure, wherein the controller capability TLV structure includes a second C-bit, wherein the second C-bit is set to a first value to indicate the secondary controller is a controller.

8. A method implemented by a secondary controller in a controller cluster including a primary controller and the secondary controller, comprising:

detecting a potential failure of the primary controller;

transmitting a first message to a network element (NE) in communication with the primary controller and the secondary controller, wherein the first message includes a controllers type length value (TLV) structure with an indication that the secondary controller is attempting to promote itself to a new primary controller for the controller cluster based on detection of the potential failure, wherein the controllers TLV structure further identifies a number of controllers including the secondary controller and one or more controllers connected to the secondary controller, and an old position of the secondary controller comprising a prior relative position of the secondary controller within the controller cluster before the controller cluster or controller group is split;

failing to receive, within a predetermined period of time, a second message from the network element indicating that the primary controller is still active; and promoting itself to the new primary controller for the controller cluster.

9. The method of claim 8, wherein the indication in the controllers TLV structure that the secondary controller is attempting to promote itself comprises a C-bit set to a first value and a position field set to a second value.

10. The method of claim 9, wherein the first value is zero and the second value is one.

11. The method of claim 9, further comprising transmitting, to the network element, a third message including an updated controllers TLV structure, the updated controllers TLV structure comprising the C-bit set to the first value and the position field set to the second value to indicate that the secondary controller is the new primary controller, wherein the first value is one.

12. The method of claim 11, wherein the first message is transmitted over an information channel, and wherein the third message is transmitted over the information channel or a control channel.

13. The method of claim 8, further comprising removing an information channel between the secondary controller and the network element and establishing a control channel between the secondary controller and the network element after the secondary controller has promoted itself to the new primary controller for the controller cluster.

14. The method of claim 8, wherein one or more of the primary controller and the secondary controller is a path computational element (PCE), and wherein the network element is a path computational client (PCC).

15. A method implemented by a network element (NE) in communication with a primary controller and a secondary controller in a controller cluster, comprising:

receiving a first message from the secondary controller, wherein the first message includes a controllers type length value (TLV) structure with an indication that the secondary controller is attempting to promote itself to a new primary controller for the controller cluster based on detection of a failure of a communication link between the primary controller and the secondary controller, wherein the controllers TLV structure further identifies a number of controllers including the secondary controller and one or more controllers connected to the secondary controller, and an old position of the secondary controller comprising a prior relative position of the secondary controller within the controller cluster before the controller cluster or controller group is split;

transmitting the first message to the primary controller;

receiving a second message from the primary controller, wherein the second message includes a second controllers type length value (TLV) structure with an indication that the primary controller is still active; and transmitting the second message to the secondary controller to prevent the secondary controller from promoting itself to the new primary controller.

16. The method of claim 15, wherein the indication in the controllers TLV structure that the secondary controller is attempting to promote itself comprises a C-bit set to a first value and a position field set to a second value, wherein the first value is zero and the second value is one.

17. The method of claim 15, wherein the indication in the second controllers TLV structure that the primary controller is still active comprises a second C-bit set to one and a second position field set to one.

18. A method implemented by a secondary controller in a controller cluster, comprising:

detecting a failure that divides the controller cluster into a first controller group and a second controller group, wherein the second controller group includes the secondary controller;

transmitting a first message to a network element (NE) in communication with each controller in the controller cluster, wherein the first message includes a controllers type length value (TLV) structure identifying the secondary controller as an intended primary controller for the second controller group, a total number of controllers in the second controller group, and a prior position of the secondary controller in the controller cluster, wherein the controllers TLV structure further identifies the total number of controllers as including the secondary controller and one or more controllers connected to the secondary controller as controllers, and the prior position as an old position of the secondary controller within the controller cluster before the controller cluster or controller group is split;

receiving a second message from the NE, wherein the second message includes a second controllers TLV structure identifying a primary controller from the first controller group as an intended primary controller for the first controller group, a number of controllers in the first controller group, and a prior position of the primary controller in the controller cluster;

comparing the number of controllers in the first controller group to the number of controllers in the second controller group;

determining to maintain its position as the secondary controller for the controller cluster when the number of controllers in the first controller group exceeds the number of controllers in the second controller group; and promoting itself to a new primary controller for the controller cluster when the number of controllers in the second controller group exceeds the number of controllers in the first controller group.

19. The method of claim 18, wherein the controllers TLV structure in the first message and the second controllers TLV structure in the second message each comprise a C-bit set to a first value, and wherein the first value is zero.

20. The method of claim 18, further comprising:

comparing the prior position of the primary controller in the controller cluster with the prior position of the secondary controller in the controller cluster when the number of controllers in the second controller group is equal to the number of controllers in the first controller group; and promoting itself to a new primary controller for the controller cluster when the prior position of the secondary controller in the controller cluster is lower than the prior position of the primary controller in the controller cluster.

21. The method of claim 18, further comprising receiving a third message from the NE when the secondary controller has determined to maintain its position as the secondary controller, wherein the third message includes a third controllers TLV structure identifying a primary controller from the first controller group as the new primary controller.

* * * * *